(12) United States Patent
Ellis, Jr. et al.

(10) Patent No.: US 11,543,472 B2
(45) Date of Patent: Jan. 3, 2023

(54) MAGNETIC SENSOR ARRAY DEVICE OPTIMIZATION

(71) Applicant: Lexmark International, Inc., Lexington, KY (US)

(72) Inventors: James Howard Ellis, Jr., Lexington, KY (US); Keith Bryan Hardin, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 17/465,617

(22) Filed: Sep. 2, 2021

(65) Prior Publication Data

US 2021/0396821 A1 Dec. 23, 2021

Related U.S. Application Data

(63) Continuation-in-part of application No. 17/193,554, filed on Mar. 5, 2021, which is a continuation-in-part of application No. 17/012,456, filed on Sep. 4, 2020, now Pat. No. 11,442,122, which is a continuation-in-part of application No. 16/429,710, filed on Jun. 3, 2019, now Pat. No. 10,921,393.

(60) Provisional application No. 63/073,596, filed on Sep. 2, 2020.

(51) Int. Cl.
*G01R 33/12* (2006.01)
*G01R 33/00* (2006.01)
*H04L 9/08* (2006.01)
*G01R 33/07* (2006.01)

(52) U.S. Cl.
CPC ..... *G01R 33/1215* (2013.01); *G01R 33/0094* (2013.01); *G01R 33/072* (2013.01); *H04L 9/0861* (2013.01); *H04L 2209/04* (2013.01)

(58) Field of Classification Search
None
See application file for complete search history.

(56) References Cited

U.S. PATENT DOCUMENTS

2021/0345898 A1* 11/2021 Okatake ............. G01R 33/0041

FOREIGN PATENT DOCUMENTS

WO WO-2015121447 A1 * 8/2015 ......... G01R 33/0005

* cited by examiner

*Primary Examiner* — Kristy A Haupt

(57) ABSTRACT

A magnetic sensor array device is comprised of an array of magnetic sensors arranged on a common semiconductor substrate to measure the multi-axis magnetic field of an arbitrary sized region at high speed with high spatial resolution and high magnetic resolution. This invention further improves a multi-axis magnetic sensor array device fabricated on a common semiconductor substrate with additional optimizations to provide for variable spatial resolution, variable magnetic resolution, and a novel secret key derivation.

12 Claims, 19 Drawing Sheets

FIG. 18E

1847a: M=0b, N=1b
MCM=0001 1000
MR0=0000 0000
MR1=0001 1000

FIG. 18F

1857a: M=0b, N=1b
MCM=1100 0011
MR0=0000 0000
MR1=1100 0011

FIG. 18G

1867a: M=0b, N=2b
MCM=1102 2011
MR0=0000 0000
MR1=1000 0001
MR2=0001 1000
MR3=0000 0000

FIG. 18H

1877a: M=0b, N=3b
MCM=0123 2104
MR0=0001 0000
MR1=0010 1000
MR2=0100 0100
MR3=1000 0010
MR4=0000 1000
MR5=0000 0000
MR6=0000 0000
MR7=0000 0000

|   | 0 | 1 | 2 | 3 | 4 | 5 | 6 | 7 |
|---|---|---|---|---|---|---|---|---|
| 0 | X |   |   |   |   |   |   | X |
| 1 |   | X |   |   |   | X |   |   |
| 2 |   |   | X |   | X |   |   |   |
| 3 |   |   |   | X | X |   |   |   |
| 4 |   |   |   | X | X |   |   |   |
| 5 |   |   | X |   |   | X |   |   |
| 6 |   | X |   |   |   |   | X |   |
| 7 | X |   |   |   |   |   |   | X |

1887b

1887a:
M=0b, N=2b
MCM=0123 3210
MR0=1000 0001
MR1=0100 0010
MR2=0010 0100
MR3=0001 1000

FIG. 18I

|   | 0 | 1 | 2 | 3 | 4 | 5 | 6 | 7 |
|---|---|---|---|---|---|---|---|---|
| 0 | X | X | X | X | X | X | X | X |
| 1 |   |   |   |   |   | X |   |   |
| 2 |   |   |   |   | X |   |   |   |
| 3 |   |   |   | X |   |   |   |   |
| 4 |   |   | X |   |   |   |   |   |
| 5 |   | X |   |   |   |   |   |   |
| 6 |   | X |   |   |   |   |   |   |
| 7 | X | X | X | X | X | X | X | X |

1897b

1897a:
M=0b, N=3b
MCM=0123 4567
MR0=1111 1111
MR1=0000 0010
MR2=0000 0100
MR3=0000 1000
MR4=0001 0000
MR5=0010 0000
MR6=0100 0000
MR7=1111 1111

FIG. 18J

MAGNETIC SENSOR ARRAY DEVICE OPTIMIZATION

CROSS REFERENCES TO RELATED APPLICATIONS

This application claims priority and benefit under 35 U.S.C. 119(e) from U.S. provisional application No. 63/073,596 titled "Magnetic Sensor Array Device Optimization," having a filing date of Sep. 2, 2020. This application also claims priority as a continuation-in-part of U.S. patent application Ser. No. 17/193,554 titled "Magnetic Sensor Array Device Optimizations and Hybrid Magnetic Camera," having a filing date of Mar. 5, 2021, which is a continuation-in-part of U.S. patent application Ser. No. 17/012,456 titled "A Sensor Array for Reading a Magnetic PUF," having a filing date of Sep. 4, 2020, which is a continuation in part of U.S. patent application Ser. No. 16/429,710 titled "Magnetometer Chip Sensor Array for Reading a Magnetic PUF, including a Magnetic PUF Film or Tape, and Systems Incorporating the Reader," having a filing date of Jun. 3, 2019 and which issued as U.S. Pat. No. 10,921,393 on Feb. 16, 2021.

BACKGROUND

1. Field of the Invention

This invention relates generally to a magnetic sensor array device comprised of an array of magnetic sensors arranged on a common semiconductor substrate in order to measure the multi-axis magnetic field of an arbitrary sized region with high spatial resolution, reduced sensing distance, higher measurement throughput, motion tolerance, temperature tolerance, and improved manufacturing yield. A further invention disclosed is the utilization of a central area of a surface to measure the normal magnetic field using Hall effect plates that are on the surface of the area.

2. Description of the Related Art

The authentication system disclosed in U.S. Pat. No. 9,553,582 is based on a unique physical object, where the unique physical object is a PUF (Physical Unclonable Function) that contains magnetic particles that are random in size, shape and orientation, which when magnetized generate a complex and random (in amplitude and direction) magnetic field near the surface of the PUF object. This magnetic field may be measured, either at discrete points, along a path, or in additional manners, and the data corresponding to the magnetic field components recorded for later comparison and authentication of the PUF object.

SUMMARY OF THE INVENTION

A magnetic field measurement system can be constructed using a single discrete magnetic field sensor device (1 sensor/device), such as a Hall effect sensor, where the sensor and the PUF part are moved relative to one another along a path (e.g., linear, parabolic, circular, etc.) in order to record the magnetic field over the surface of the PUF object.

Alternatively, a magnetic field measurement system can be constructed using more than one discrete magnetic sensor device arranged in a one or more-dimensional array where the magnetic sensor array and the PUF object are moved relative to one another along a path (e.g., linear, parabolic, circular, etc.) in order to record the magnetic field over the surface of the PUF object.

These two magnetic field measurement systems just described require the use of a motion control system to traverse the entire area of the PUF part and record its magnetic field measurements. The need for a motion control system adds significant system cost and measurement time which was alleviated with the improved magnetic field measurement system disclosed in U.S. patent application Ser. Nos. 17/012,456; 17/012,474; and Ser. No. 17/012,483, each titled "A Sensor Array for Reading a Magnetic PUF," which are incorporate herein by reference in their entirety.

U.S. patent application Ser. Nos. 17/012,456; 17/012,474; and Ser. No. 17/012,483 described a multi-axis magnetic sensor array device fabricated on a common semiconductor substrate using a one or more-dimensional array of multi-axis magnetic sensors (such as Hall effect sensors) by either sawing out of a semiconductor wafer more than one discrete multi-axis magnetic sensor die (where each die consists of one standalone multi-axis magnetic sensor) or by fully integrating into a single die more than one multi-axis magnetic sensor. An improvement of such a magnetic sensor array device is that it can measure the multi-axis magnetic field over the entire surface area of a PUF object with very high spatial and magnetic resolution without the need for any motion control system.

To further optimize such a magnetic sensor array device, it is highly desirable to further improve its measurement speed and accuracy. The reduction in measurement time provides a manufacturing cost benefit when faced with the problem of enrolling a very large volume of PUF parts in the shortest amount of time. The improvement in measurement accuracy provides a security benefit as it reduces the probability that a legitimate PUF object fails to be authenticated as genuine (i.e., false negative) or that an illegitimate PUF object (cloned copy or reuse of an original) is authenticated as genuine (i.e., a false positive).

Another sensor disclosed herein has an array of cells that measure a surface magnetic field. Each cell contains Hall effect sensor plates in the 3 cartesian coordinate planes to measure magnetic field components Bx, By, and Bz. By locating the Bx and By adjacent to each Bz the resolution of the Bz component is reduced. The problem to be solved is how to pack the Bz Hall effect sensor plates as close as possible without the presence of the Bx and By Hall effect sensor plates. It is known that the Bx and By components can be calculated from this surface data. However, there are at least two problems that arises from this technique. First, there are errors introduced by the truncations of the field values, and second, a magnetic field from a source that does not penetrate through the measurement plane will not be measured. For example, if a magnet is placed adjacent to the measurement surface directed with all its field lines in the measurement surface, then the magnetic field component Bz will be zero. However, there will be Bx and By components within measurement surface that only tangentially directed. Having the perimeter of the measurement surface with tangential measurement devices allows a direct measurement of the in-plane components.

The authentication system disclosed in U.S. Pat. No. 9,553,582 is based on a unique physical object, where the unique physical object is a PUF ("Physical Unclonable Function") that contains magnetic particles that are random in size, shape, and orientation which when magnetized generate a complex and random (in amplitude and direction) magnetic field near the surface of the PUF part. This magnetic field may be measured along a path or a two-dimensional region and the data corresponding to the magnetic field components recorded for later comparison and authentication of the PUF part.

U.S. patent application Ser. No. 17/012,456 described a magnetic field measurement system comprised of a multi-axis magnetic sensor array device fabricated on a common semiconductor substrate using a one or more-dimensional array of multi-axis magnetic sensors (such as hall effect sensors) that are integrated into a single substrate. The benefit of such a magnetic sensor array device is that it can measure the multi-axis magnetic field over the entire surface area of a PUF part with very high spatial and magnetic resolution without the need for a motion control system.

U.S. patent application Ser. No. 17/193,554 described methods to optimize such a magnetic sensor array device to improve its measurement speed, accuracy, and security. This application discloses additional optimizations to the magnetic sensor array device to provide for measurements of variable spatial resolution, variable magnetic resolution, and a novel secret key derivation.

The variable spatial resolution optimization enables a faster measurement to be made over the entire array with less power. The variable magnetic resolution optimization enables simultaneous measurement of both a higher magnitude magnetic field range with lower resolution and a lower magnetic field range with higher resolution. The secret key derivation provides a unique device specific security key that provides further verification that the magnetic field measurement reported by the magnetic sensor array device came from the PUF part and was not tampered with by an adversary.

These improvements and optimizations will be described in detail.

BRIEF DESCRIPTION OF THE DRAWINGS

Figure 1:
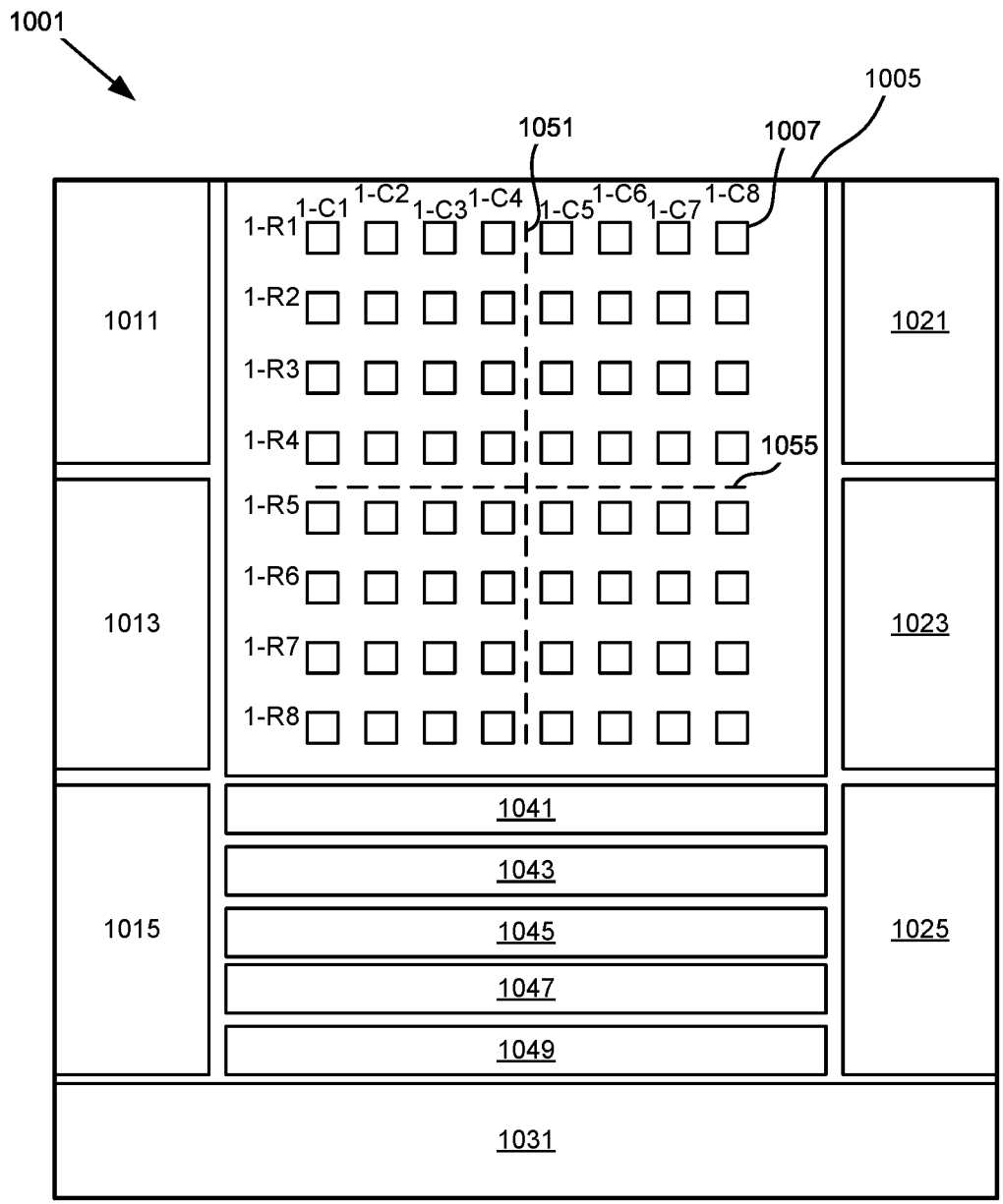

Having thus described the invention in general terms, reference will now be made to the accompanying drawings, which are not necessarily drawn to scale, and wherein:

FIG. 1 shows a fully integrated multi-axis magnetic array sensor device.

Figure 2:
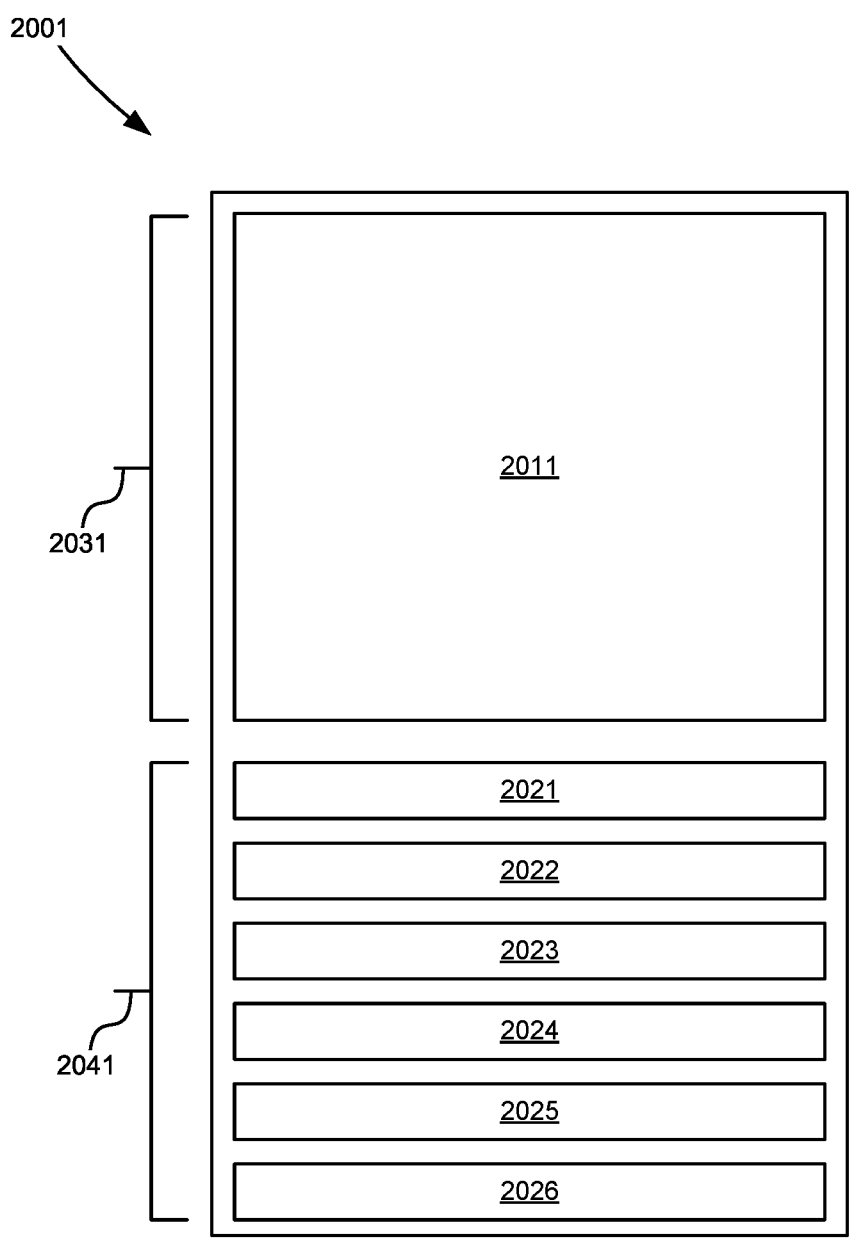

FIG. 2 shows a sensor response stage and sensor readout stage

Figure 3:
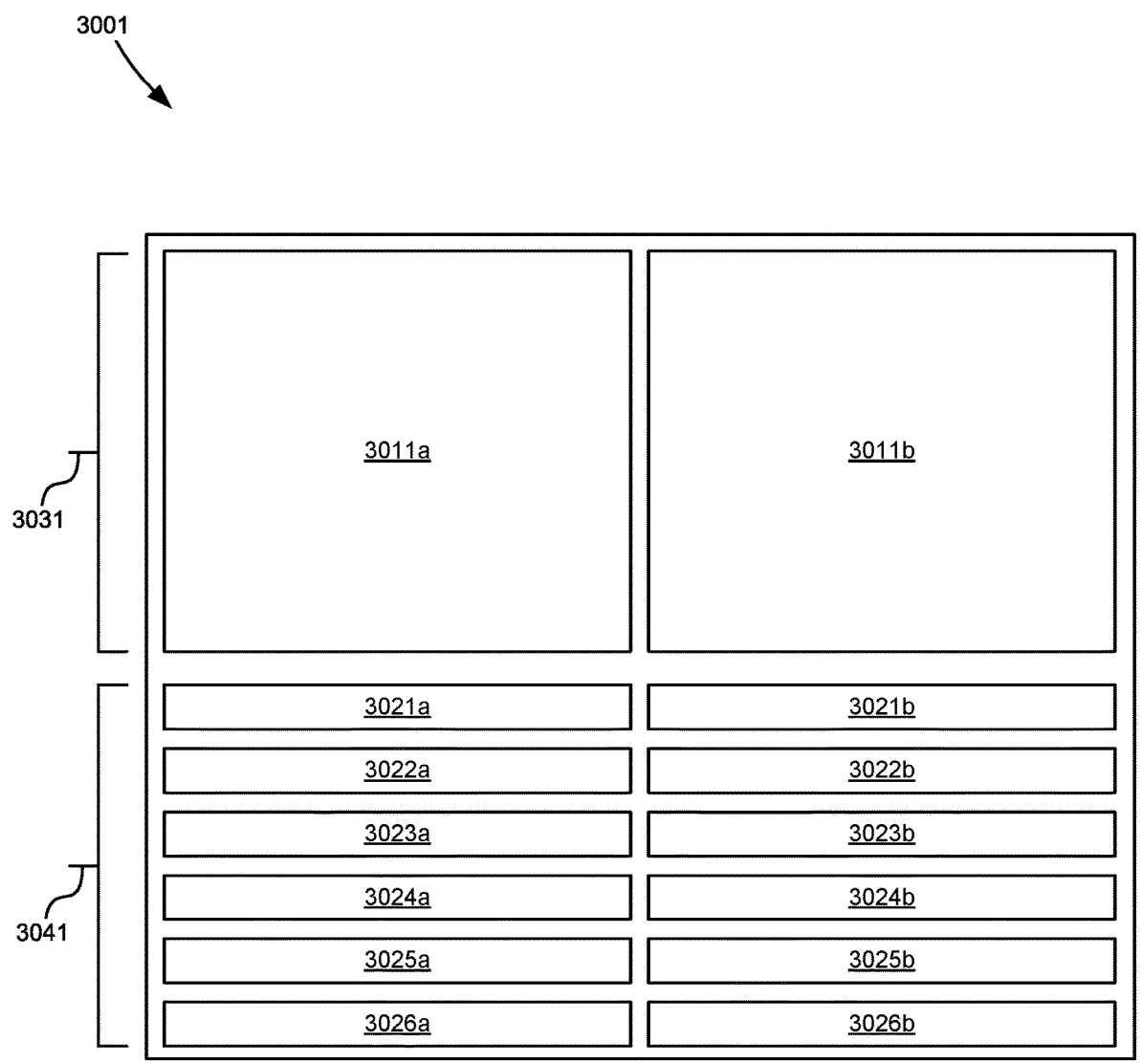

FIG. 3 shows a magnetic sensor array divided into two parts with each array part measured in parallel using the serial measurement method.

Figure 4:
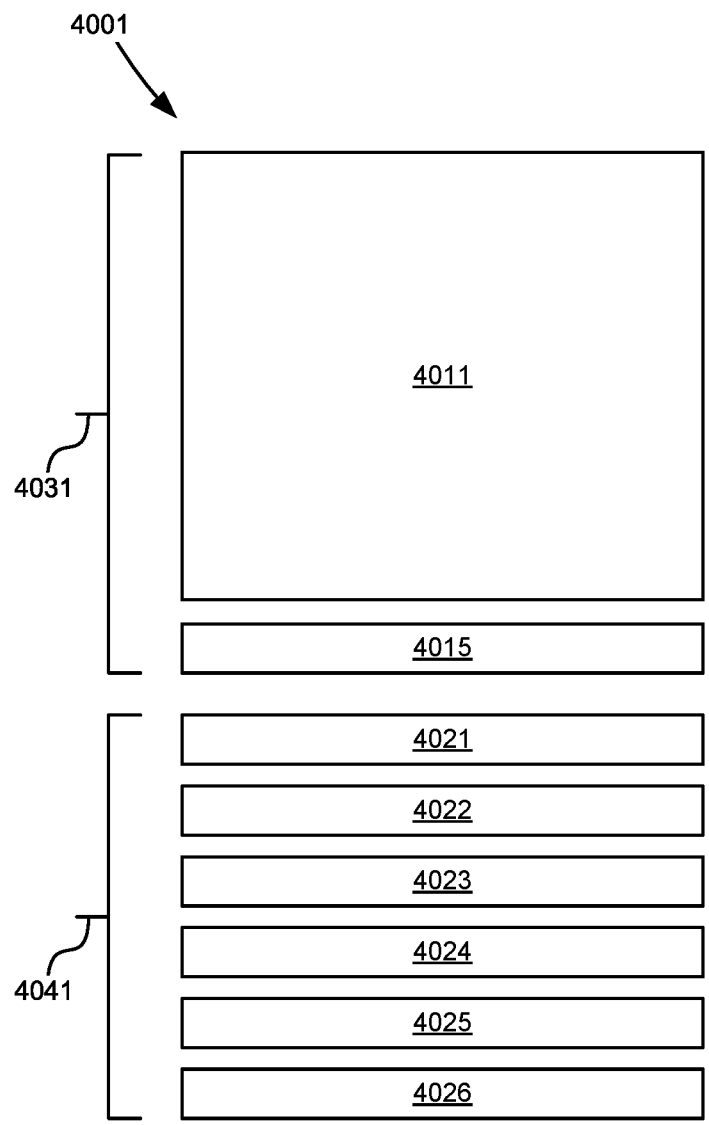

FIG. 4 shows a sensor response stage and sensor readout stage with one or more analog sample and hold registers between the sensor response stage and the amplifier stage.

Figure 5:
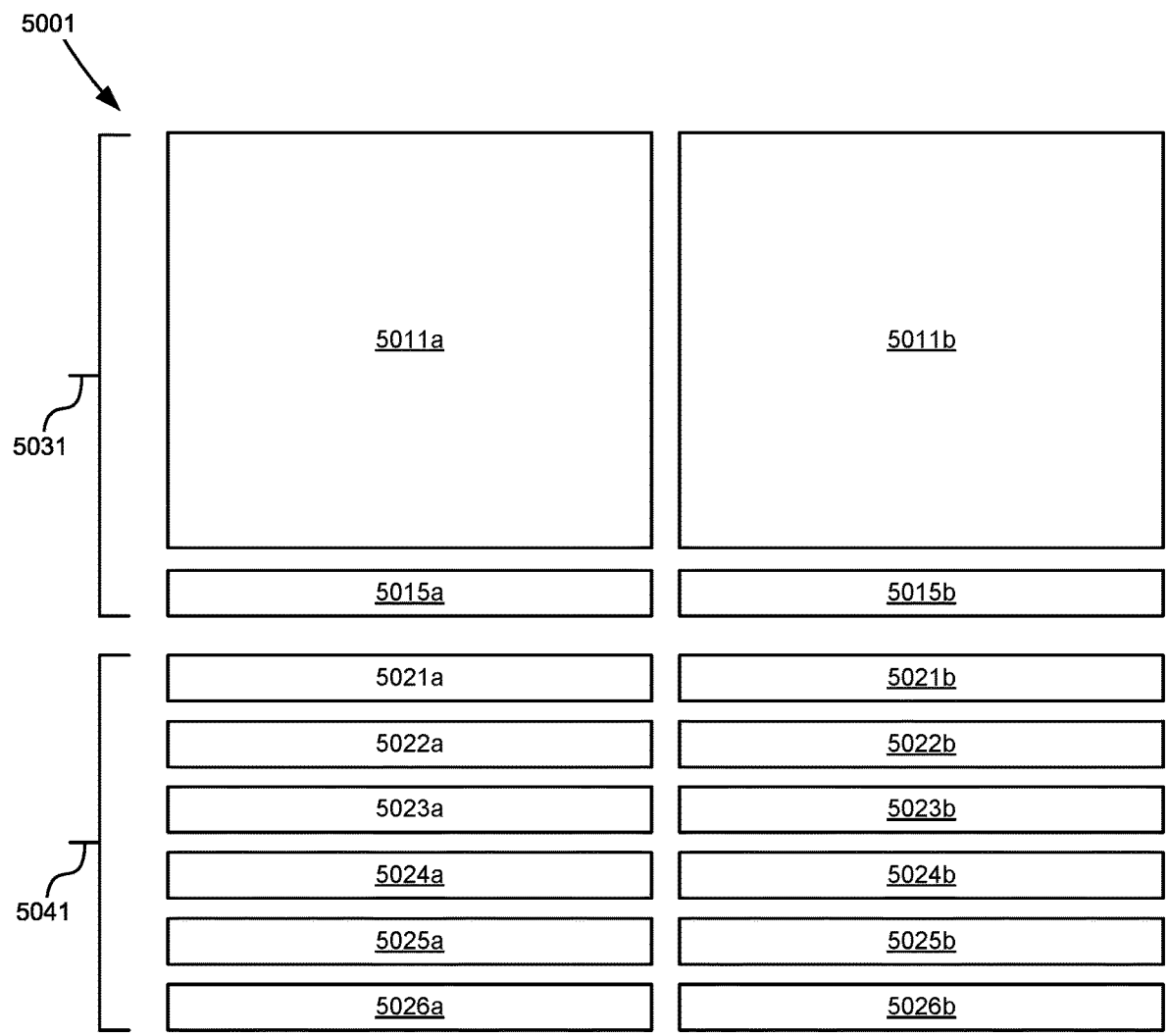

FIG. 5 shows a magnetic sensor array divided into two-parts with each array part measured in parallel using the serial pipelined measurement method.

Figure 6A:
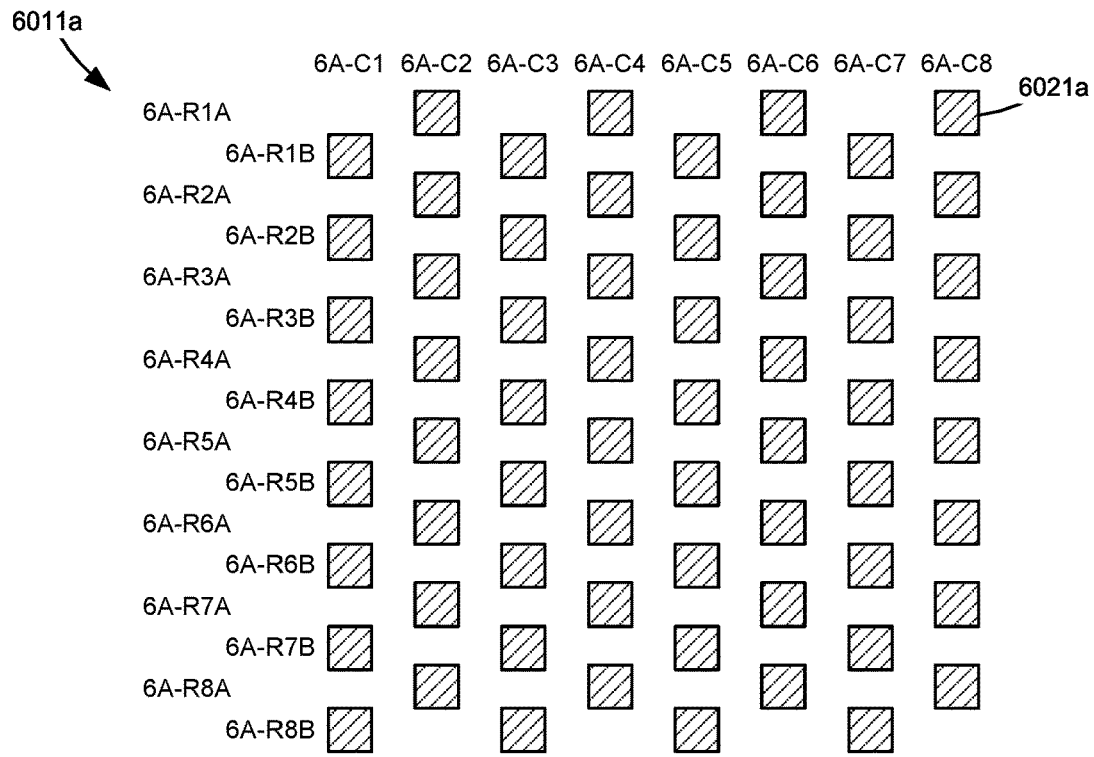

FIG. 6A shows a magnetic sensor array with a staggered row and inline column.

Figure 6B:
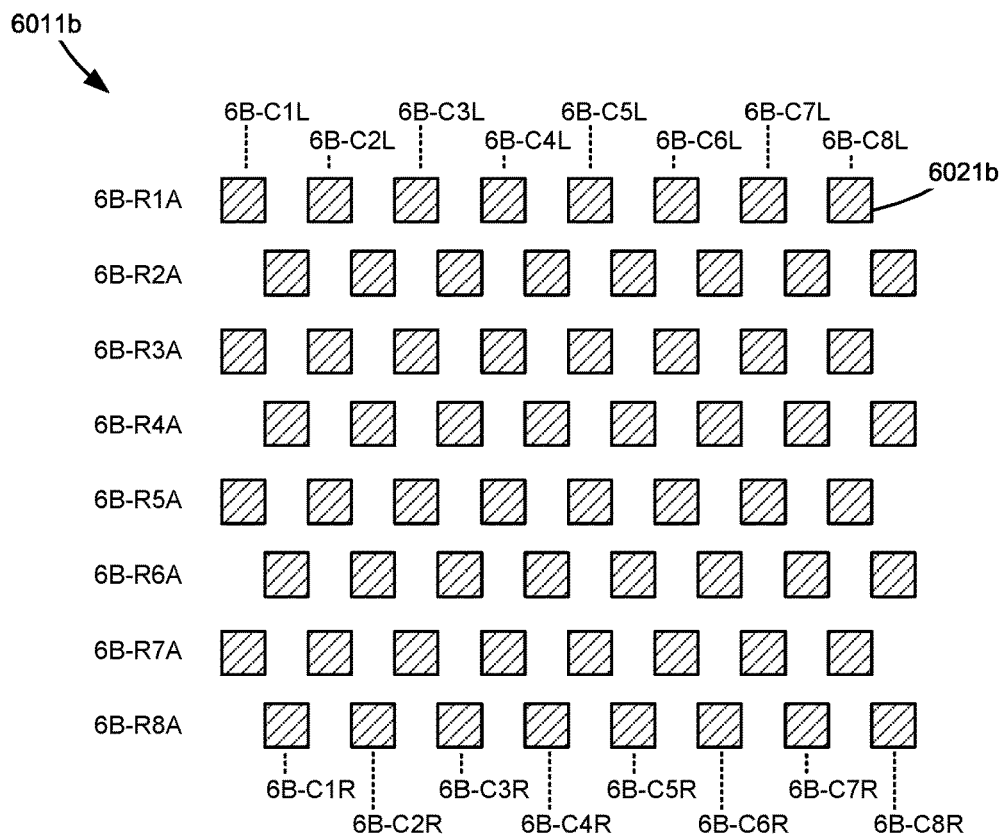

FIG. 6B shows a magnetic sensor array with an inline row and a staggered column.

Figure 7:
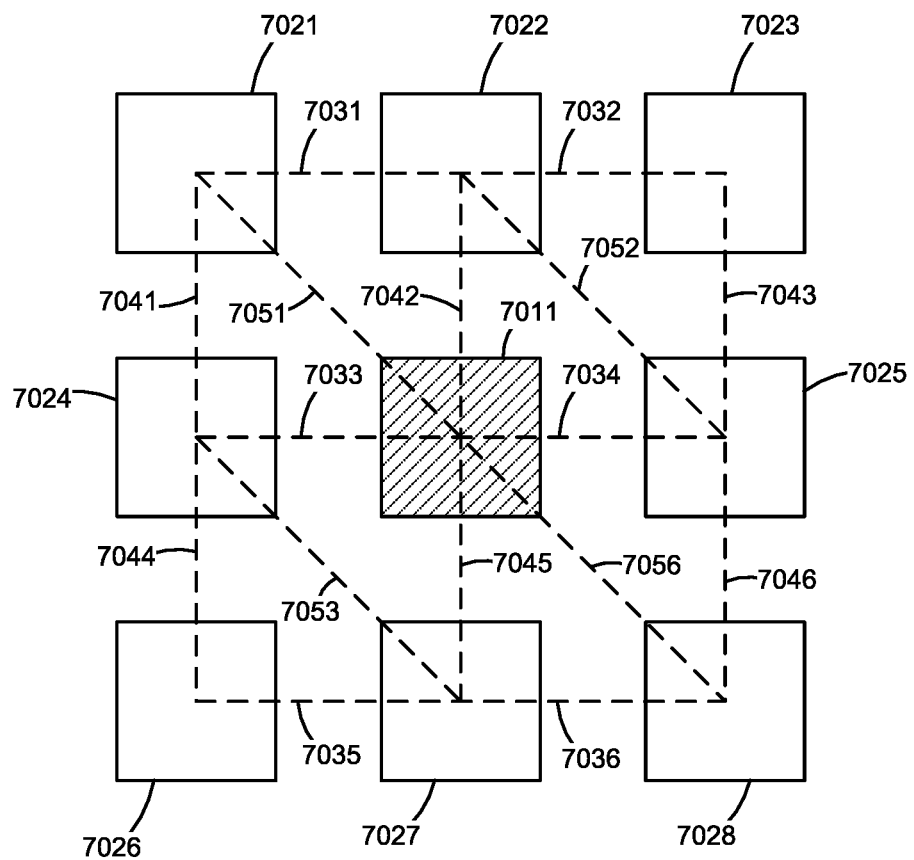

FIG. 7 shows a magnified view of an inline row and inline column arrangement of magnetic sensors.

Figure 8:
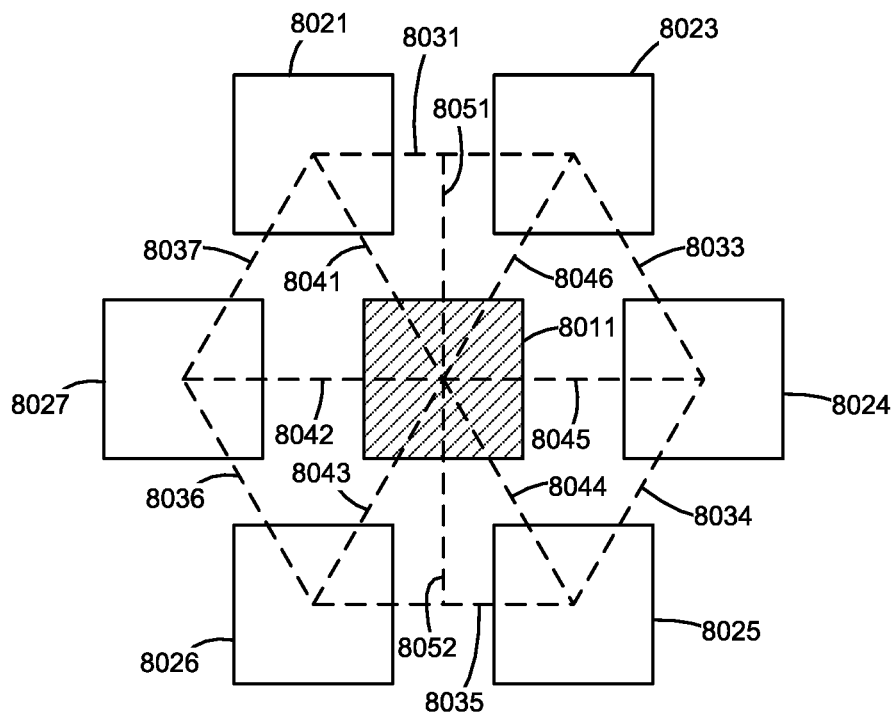

FIG. 8 shows a magnified view of an inline row and staggered column arrangement of magnetic sensors.

Figure 9:
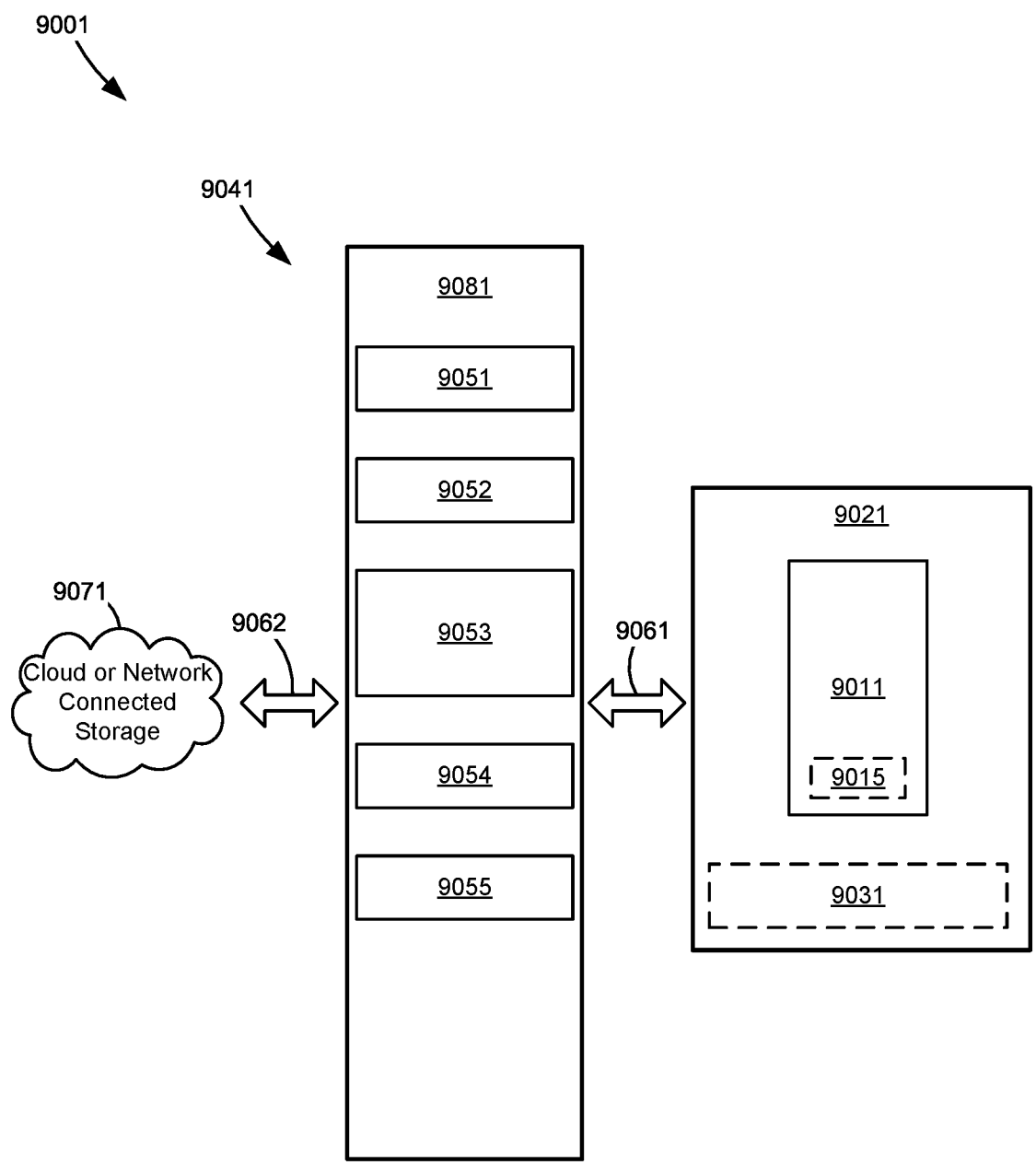

FIG. 9 shows a measurement system.

Figure 10:
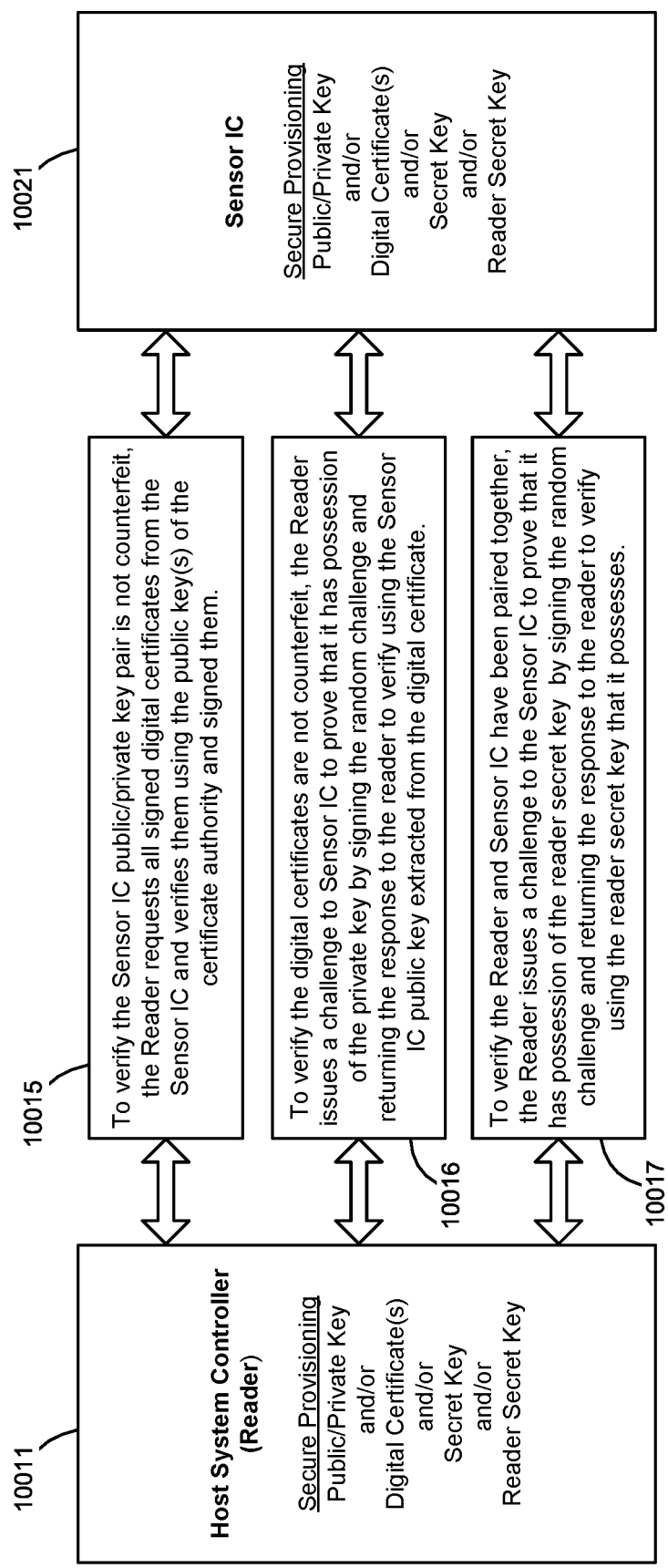

FIG. 10 shows a sensor integrated circuit authentication method by a reader.

Figure 11:
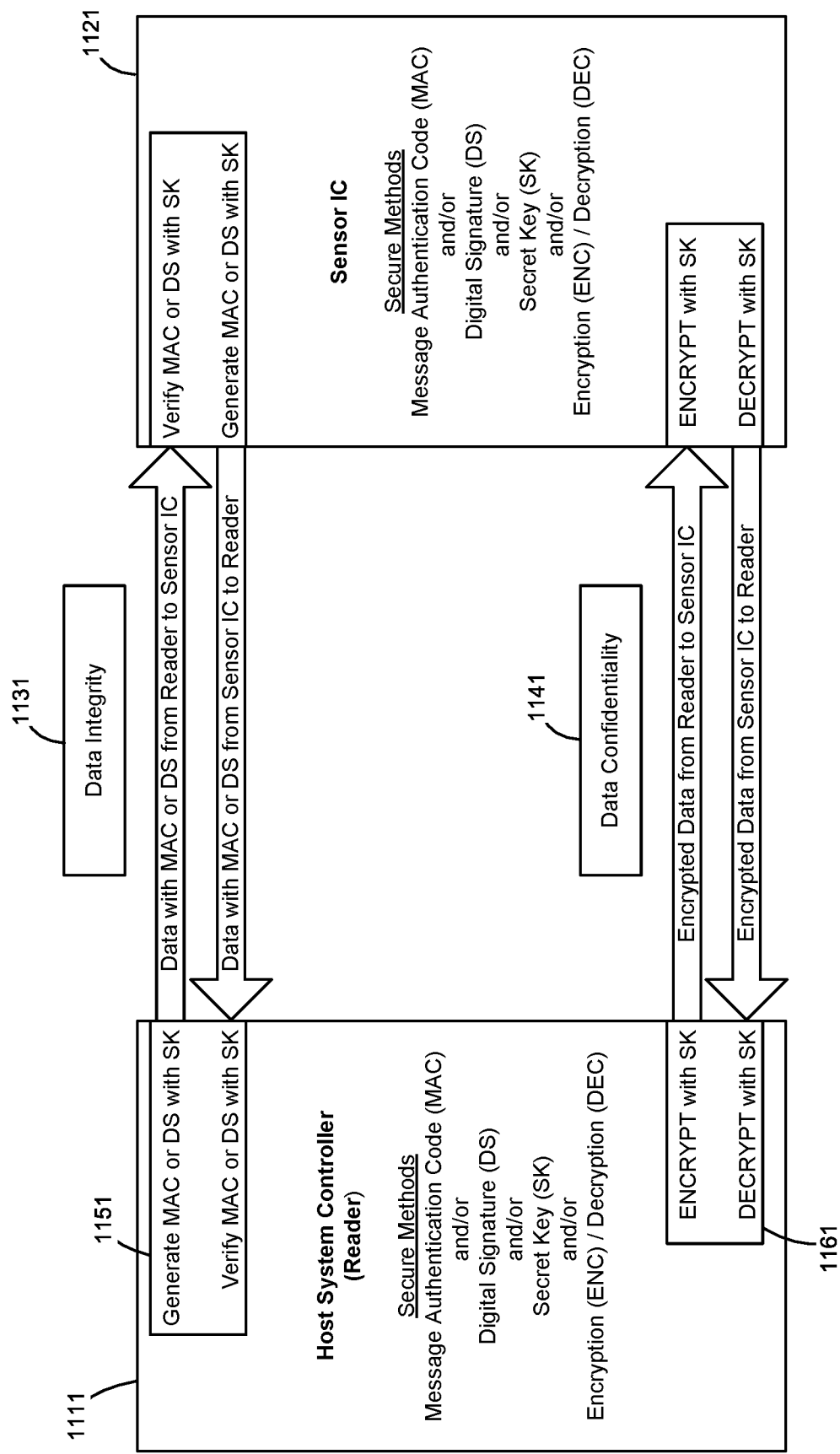

FIG. 11 shows a method of securing from tampering data transferred across an interface through the use of a standard message authentication code or digital signature.

Figure 12:
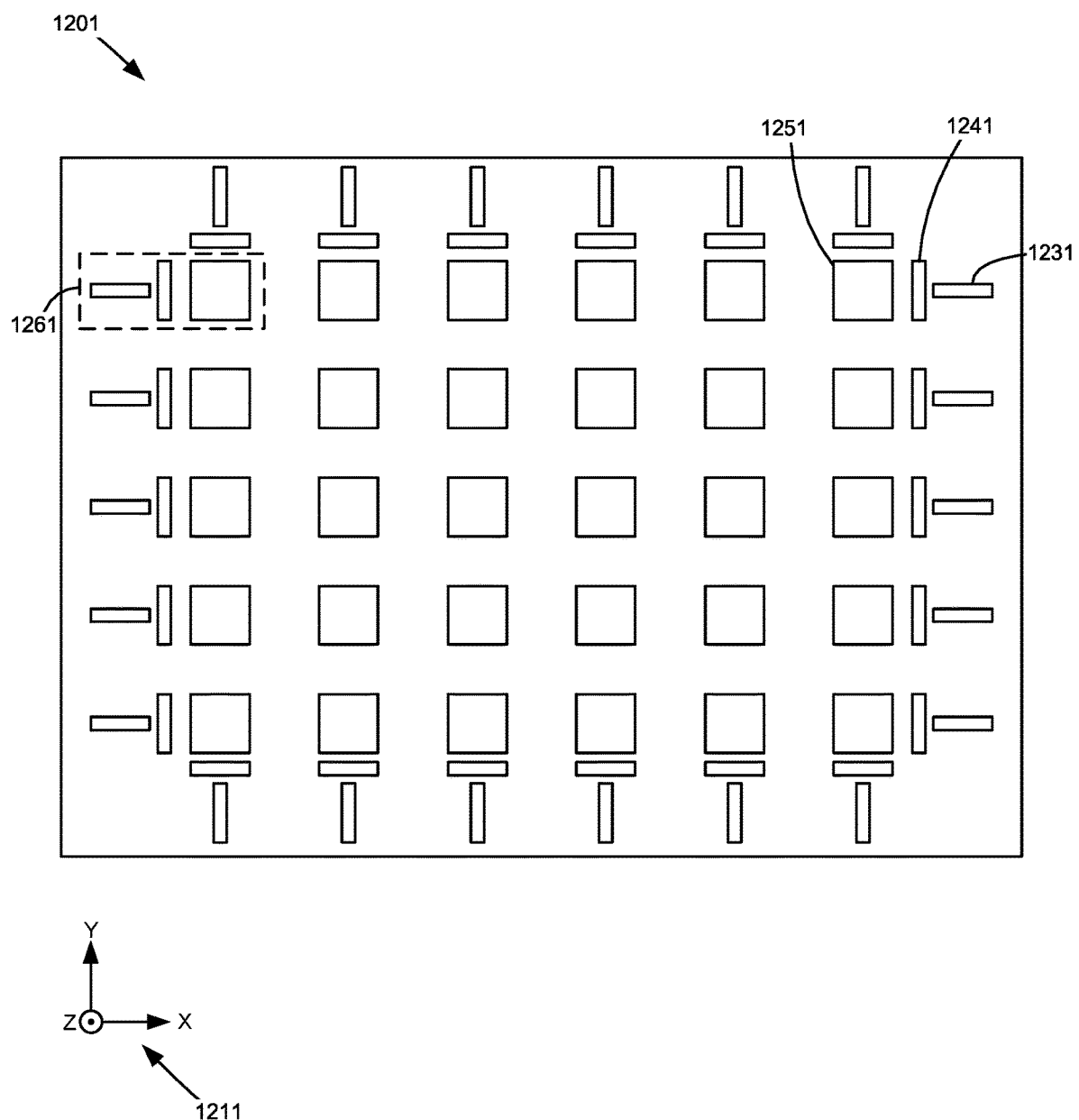

FIG. 12 shows the measurement surface with Bz measurement Hall plates.

Figure 13:
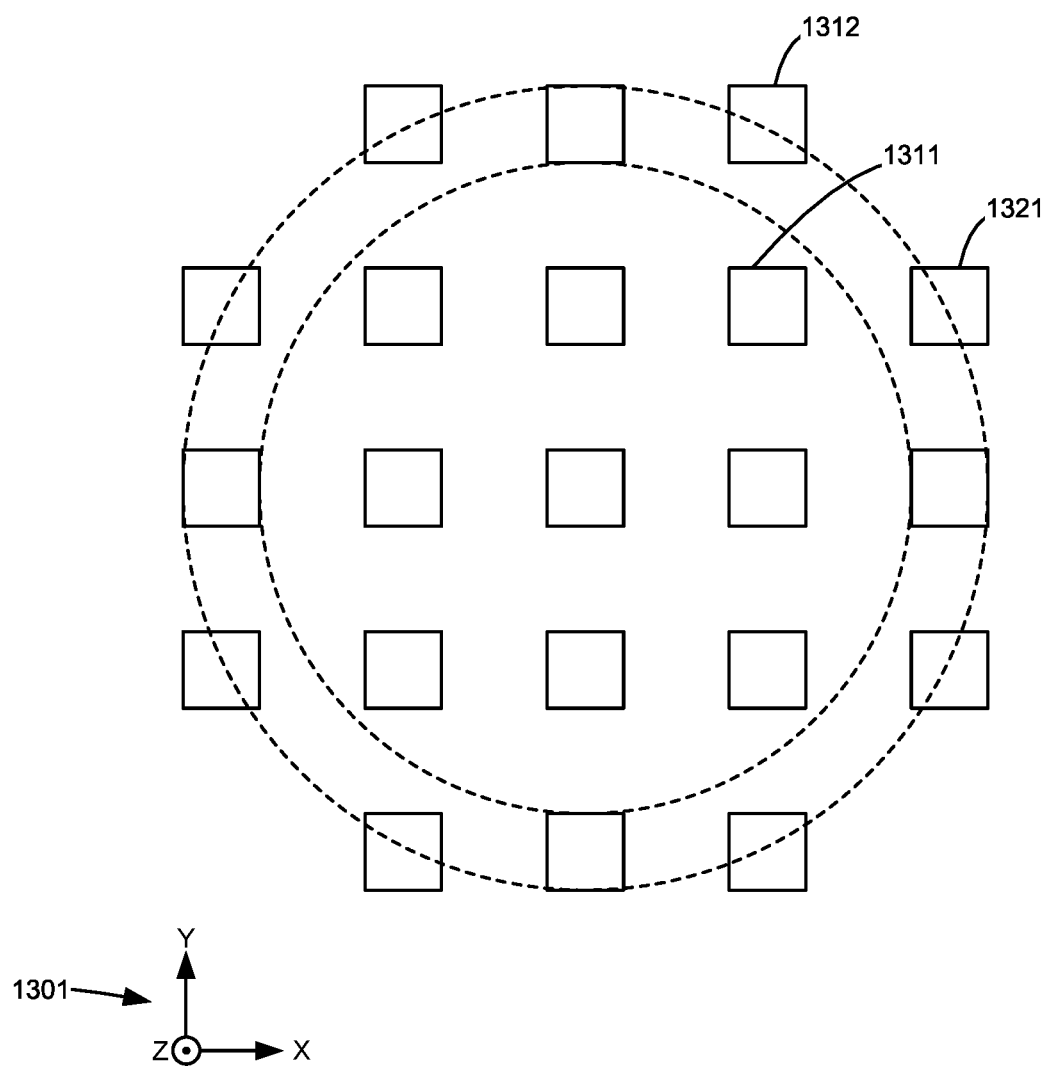

FIG. 13 shows Hall plates with a magnetic concentrator ring.

Figure 14:
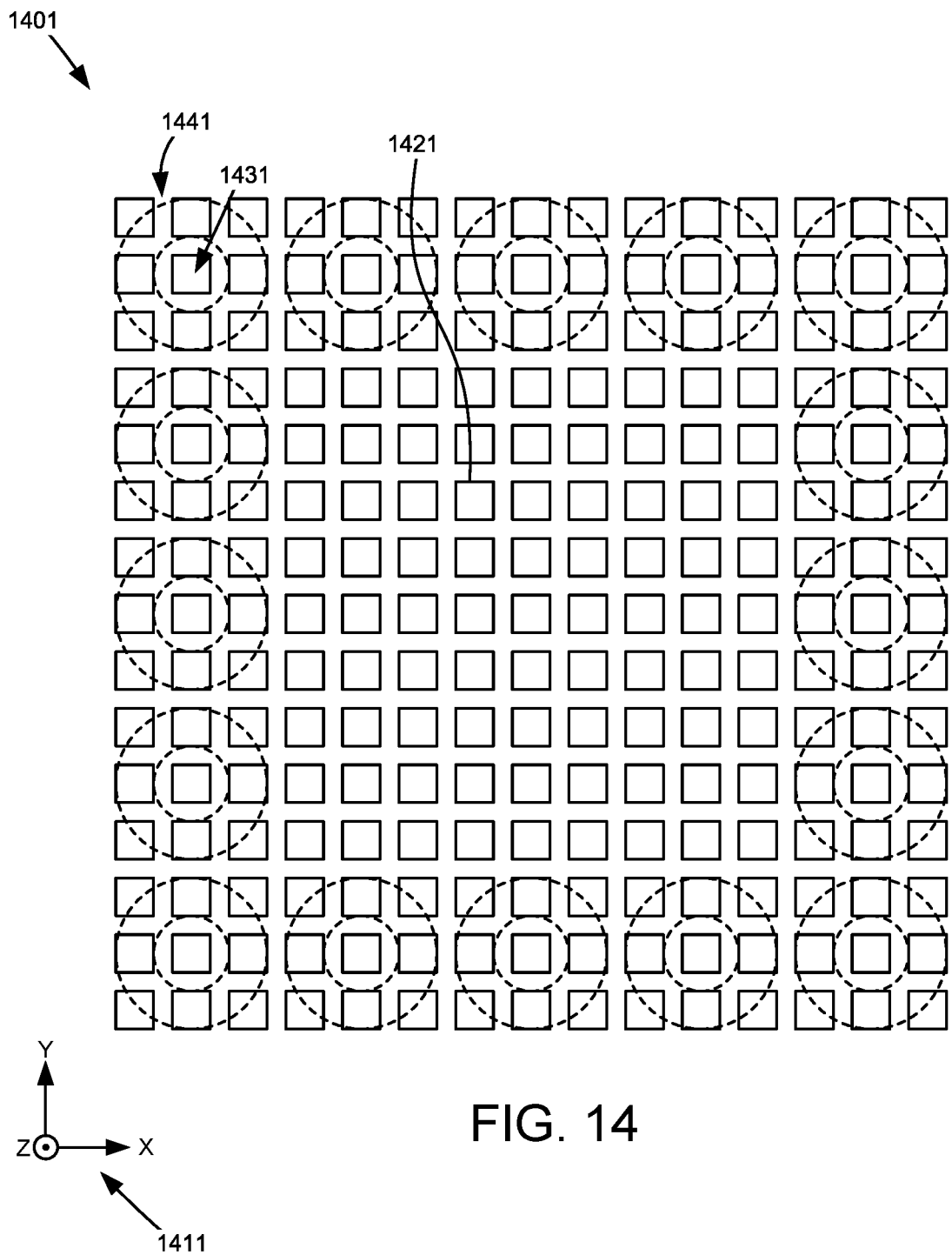

FIG. 14 shows Hall plates with magnetic concentrator rings around the edge elements.

Figure 15:
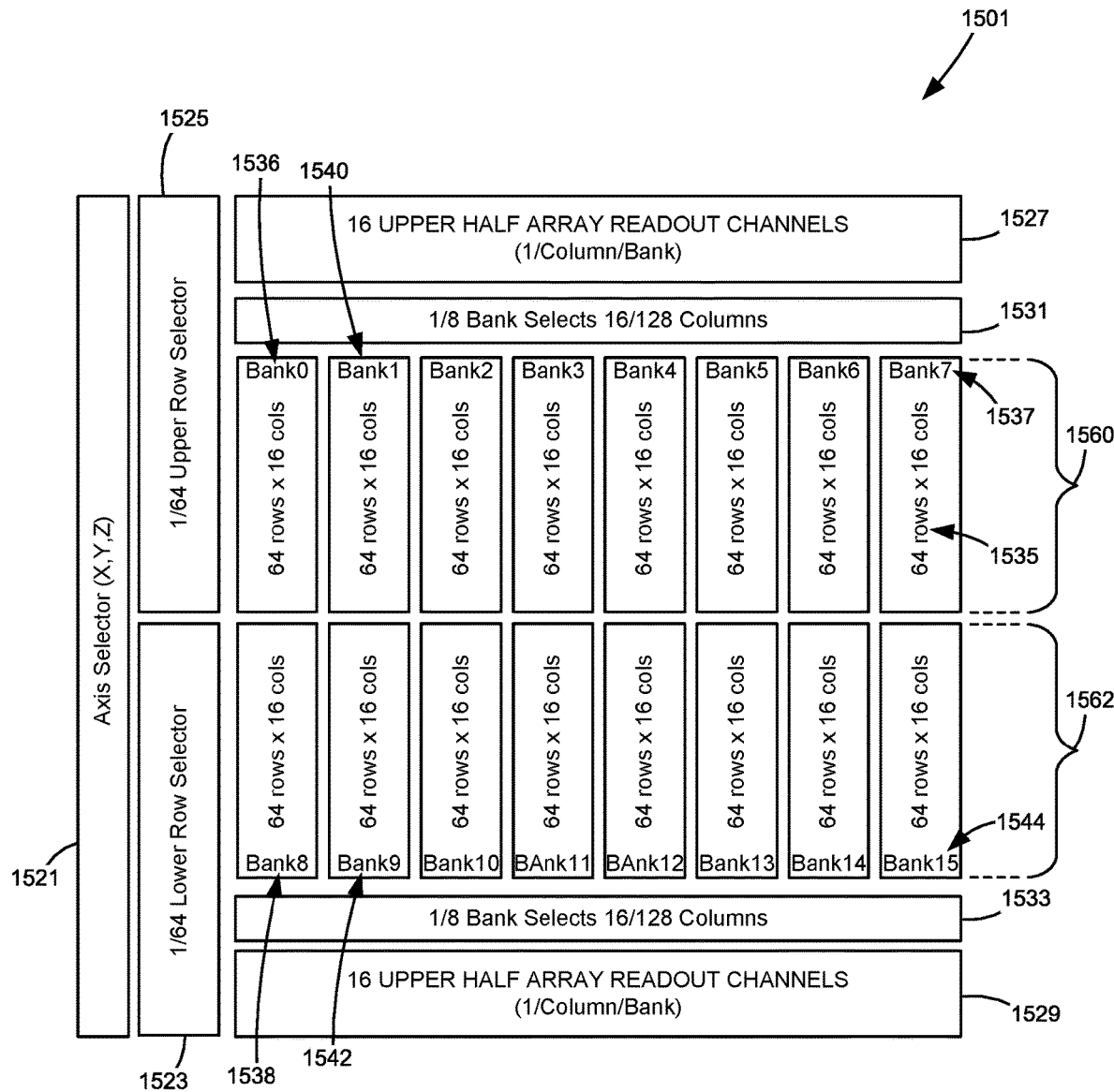

FIG. 15 shows a multi-axis magnetic sensor array organized into multiple banks of multi-axis sensor columns and multiple banks of multi-axis sensor rows.

Figure 16:
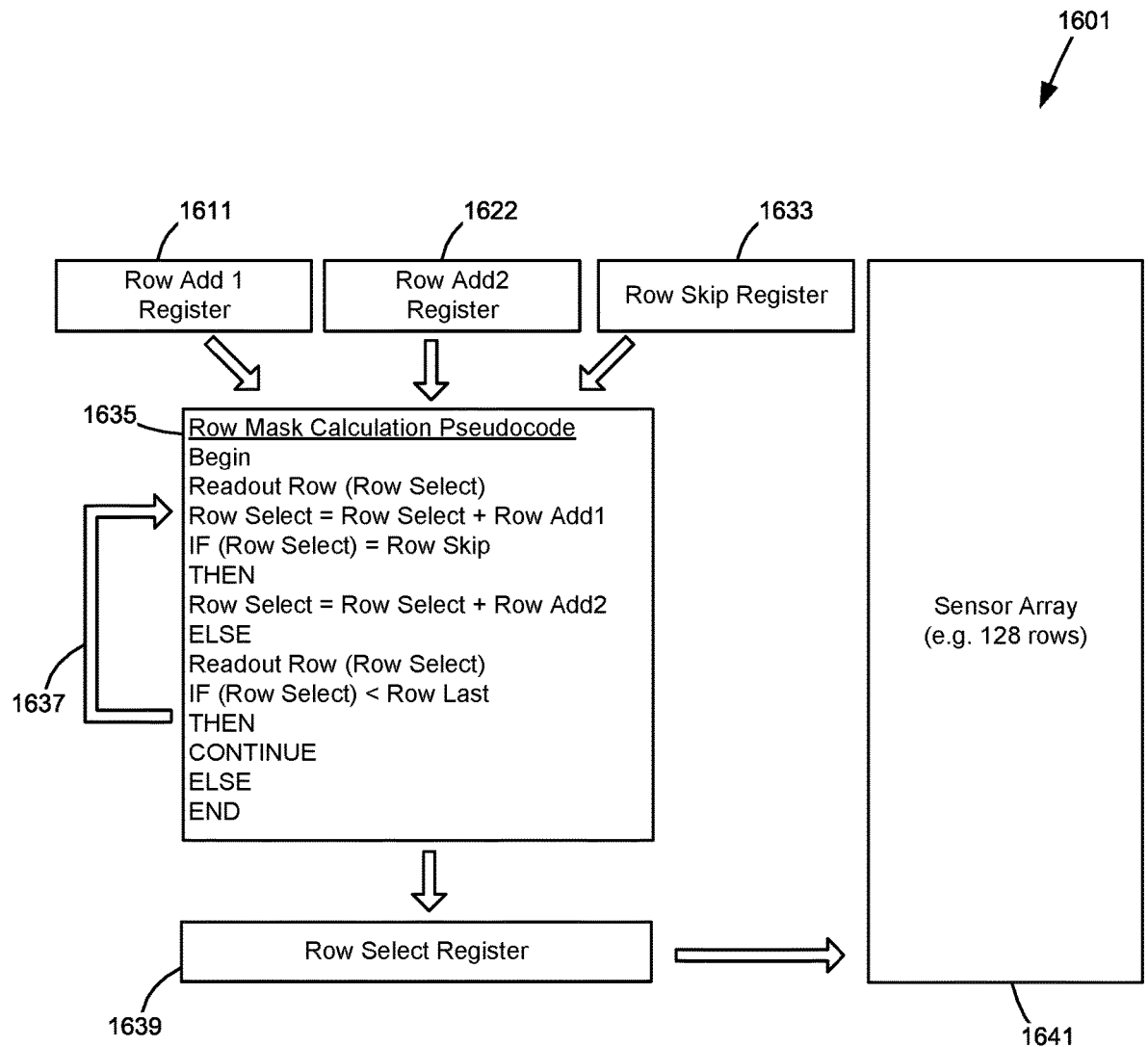

FIG. 16 shows a row mask array readout method.

Figure 17:
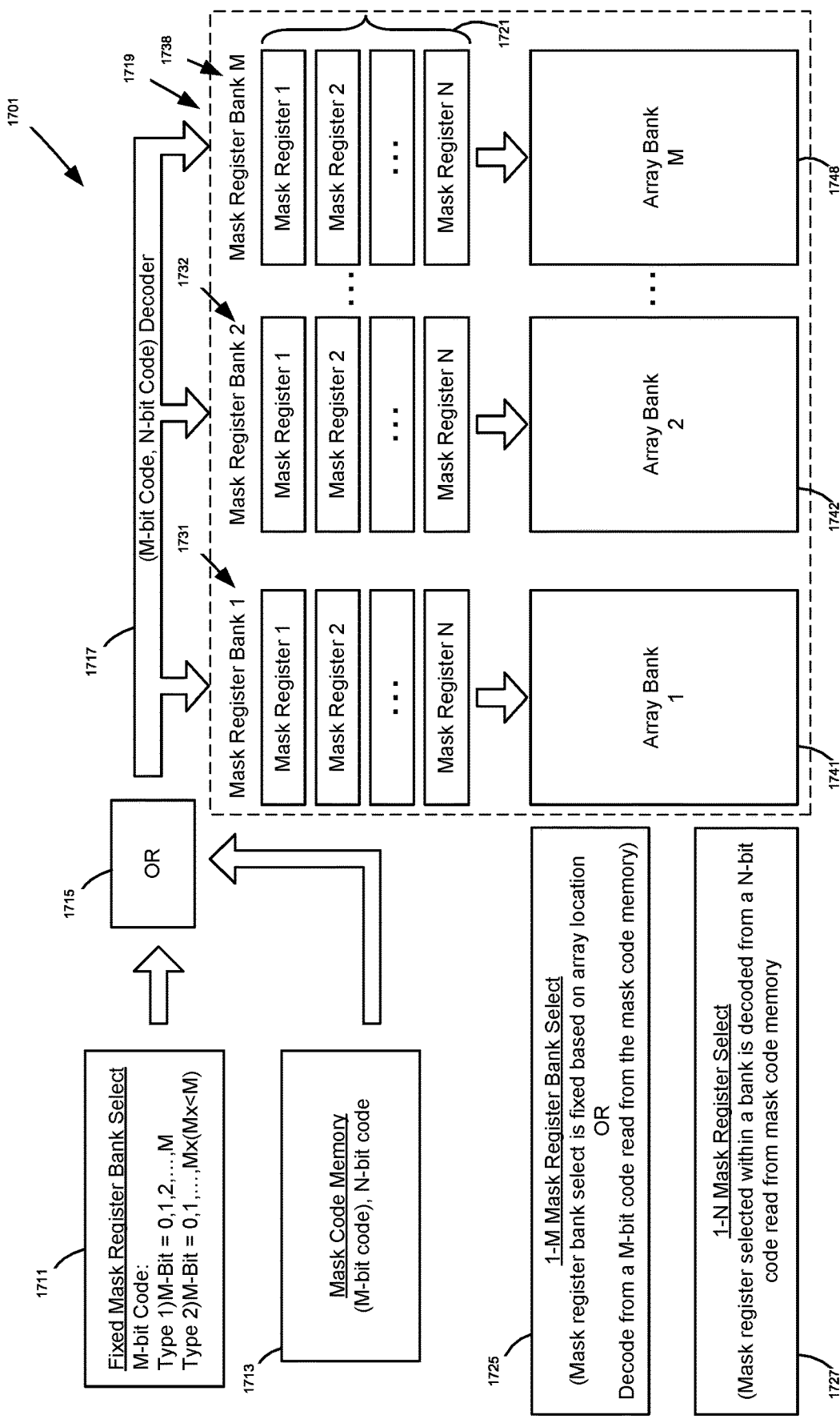
Figures 18A, 18B:
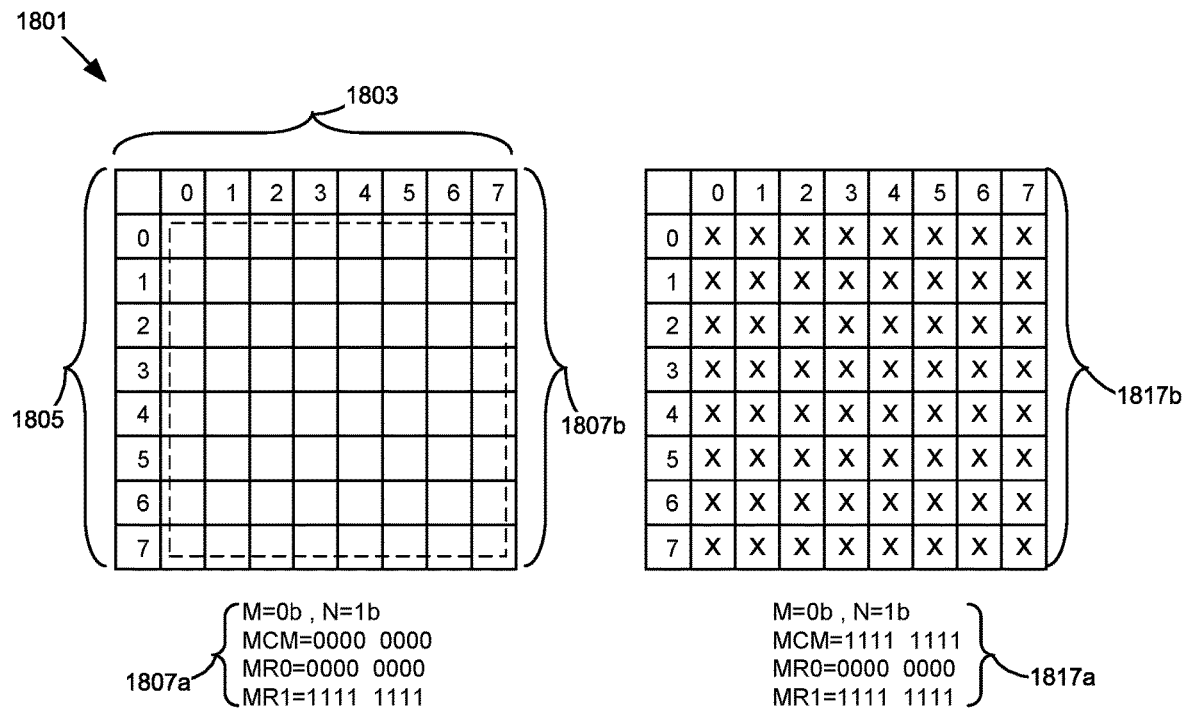
Figures 18C, 18D:
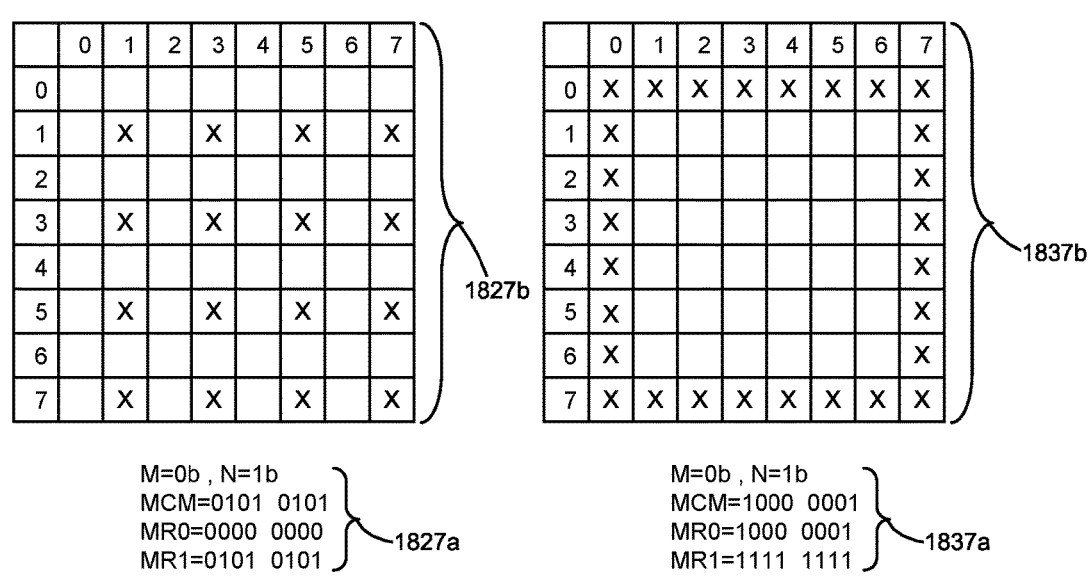

FIG. 17 shows a column mask array readout method.

FIGS. 18a, 18b, 18c, 18d, 18e, 18f, 18g, 18h, 18i, and 18j show illustrative row and column array mask patterns.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology, terminology and dimensions used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having" and variations thereof herein is meant to encompass the items listed thereafter and equivalents thereof as well as additional items. Terms such as "about" and the like are used to describe various characteristics of an object, and such terms have their ordinary and customary meaning to persons of ordinary skill in the pertinent art. The dimensions of the magnetic particles, separations between particles and sensor locations are interrelated and can be proportionally scaled with respect to each other to provide different dimensional solutions.

The present invention is described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Measurement Optimization

Consider the fully integrated multi-axis magnetic array sensor device 1001 shown in FIG. 1. This monolithic integrated circuit is fabricated on a common semiconductor substrate 1005 and consists of a two-dimensional array of multi-axis magnetic sensors 1007 arranged horizontally as an arbitrary number of rows (e.g., 1-R1-1-R8) and vertically as an arbitrary number of columns (e.g., 1-C1-1-C8) along with all the analog and digital circuitry necessary for a fully integrated device with a single digital interface (such as a $I^2C$, but not limited to such) to a host computer system. The two dashed lines 1051 and 1055 divides the sensors into groups shown here as four quadrants. The groups are arbitrary for creating repeated patterns to easily replicate sections of the design. For example, cells created in the box bounded by rows 1-R1 through 1-R4 and columns 1-C1 through 1-C4 are replicated as a copy to the other three quadrants. This replication will translate all of the physical characteristics of the first quadrant to the other three. The circuitry includes a sensor array row and column readout control 1011, a host computer control interface 1013, a calibration memory 1015, a sensor array bias timing control 1021, analog current bias generator 1023, an analog voltage regulator 1025, a memory buffer 1031, a sensor analog voltage sample and hold circuit 1041, an amplification with noise cancellation circuit 1043, an analog voltage digitization circuit 1045, a thermal compensation circuit 1047, and a row digital capture register 1049.

U.S. patent application Ser. Nos. 17/012,456; 17/012,474; and 17/012,483 disclose methods to decrease the measurement time of the monolithic magnetic sensor array by measuring one or more axes of each sensor in each column of one or more rows and then incrementing through the one or more rows one at a time until the entire magnetic sensor array had been measured. These measurement methods can be called the serial (e.g., one row at a time) measurement method and the parallel (e.g., more than one row at a time) measurement method where each measurement method consists of a sensor response stage and a sensor readout stage as shown in FIG. 2. Shown in FIG. 2 is a two-dimensional magnetic sensor array 2011 that may be arranged in rows and columns (not shown) along with all the analog and digital circuitry necessary for a fully integrated device with a single digital interface (such as a I²C, but not limited to such) to a host computer system. The circuitry includes an amplification with noise cancellation circuit 2021, an analog voltage digitization circuit 2022, a thermal compensation circuit 2023, a digital capture register 2024, a memory buffer 2025, and a component for transfer to a host computer 2026. The magnetic sensor array device 2001 has a sensor readout stage 2041 and a sensor response stage 2031.

Serial Measurement Method

In the serial measurement method, an entire magnetic sensor array row is selected and biased with current (or voltage bias depending on the sensor design) and then the magnetic field induced analog voltage (or current depending on the sensor design) for each sensor in the selected row is amplified with noise cancellation, digitized, thermally compensated and captured in digital registers.

The next sensor row is selected, and the process repeats row by row until the entire magnetic sensor array is measured. After each row is readout, the magnetic field measurement result can be transferred immediately to a host computer over a digital interface or buffered in an on-chip memory until the entire array is read before being bulk transferred to a host computer over a digital interface.

Parallel Measurement Method

In the parallel measurement mode, the magnetic sensor array is divided into parts with a dedicated readout channel (amplifier, digitizer, compensation, and capture) for each array part that enables each selected sensor row in each array part to be measured in parallel. The next sensor row in each array part is then selected and the process repeats row by row in each array part in parallel until the entire magnetic sensor array is measured.

In the example shown in FIG. 3, the magnetic sensor array device 3001 is divided into two parts with each array part measured in parallel using the serial measurement method. In FIG. 3, two, two-dimensional magnetic sensor arrays 3011a and 3011b that may be arranged in rows and columns (not shown) along with all the analog and digital circuitry necessary for a fully integrated device with a single digital interface (such as a I²C, but not limited to such) to a host computer system for each two-dimensional magnetic sensor arrays is provide. The circuitry includes amplification with noise cancellation circuits 3021a, 3021b, analog voltage digitization circuits 3022a, 3022b, thermal compensation circuits 3023a, 3023b, digital capture registers 3024a, 3024b, memory buffers 3025a, 3025b, and components for transfer to a host computer 3026a, 3026b. The magnetic sensor array device 3001 has a sensor readout stage 3041 and a sensor response stage 3031.

The parallel measurement method can be extended by dividing the array into an arbitrary number of parts each having a dedicated readout channel. The parallel measurement method provides a measurement time speedup over the serial measurement method that is equivalent to the number of divided array parts (e.g., 2×, 4×, 8×, 16×, etc.)

The serial and parallel measurement methods are summarized in Table 1 for an example 8-row×8-column magnetic sensor array having a sensor response time and sensor readout time approximately equal. In the example where the array is divided into two-parts, the parallel measurement method provides a speedup of two times the serial measurement method. As stated, additional speedup can be obtained by dividing the array into additional parts with a dedicated readout channel per part.

TABLE 1

| Step | Serial Measurement Method | | Parallel Measurement Method | |
|---|---|---|---|---|
| | Sensor Response | Sensor Readout | Sensor Response | Sensor Readout |
| 1 | Row 1 | — | Row 1,5 | — |
| 2 | — | Row 1 | — | Row 1,5 |
| 3 | Row 2 | — | Row 2,6 | — |
| 4 | — | Row 2 | — | Row 2,6 |
| 5 | Row 3 | — | Row 3,7 | — |
| 6 | — | Row 3 | — | Row 3,7 |
| 7 | Row 4 | — | Row 4,8 | — |
| 8 | — | Row 4 | — | Row 4,8 |
| 9 | Row 5 | — | | |
| 10 | — | Row 5 | | |
| 11 | Row 6 | — | | |
| 12 | — | Row 6 | | |
| 13 | Row 7 | — | | |
| 14 | — | Row 7 | | |
| 15 | Row 8 | — | | |
| 16 | — | Row 8 | | |

The serial measurement method results in the lowest current (best case) to bias the sensors and the longest time (worst case) to readout the result and the parallel measurement method results in the highest current (worst case) to bias the sensors and the shortest time (best case) to readout the result. It is desirable to find a measurement method that provides the lowest current (best case) of the serial measurement method with the shortest measurement time (best case) like the parallel measurement method and this method is described as follows.

Serial Pipelined Measurement Method

A serial pipeline measurement method is disclosed to reduce the total magnetic sensor array measurement time by a factor of approximately two as compared to the serial measurement method without increasing the current by a factor of approximately two as the parallel measurement method. This optimization is enabled by inserting one or more analog sample and hold registers 4015 between the magnetic sensor array and the amplifier as shown in FIG. 4.

Shown in FIG. 4 is a two-dimensional magnetic sensor array 4011 that may be arranged in rows and columns (not shown) along with all the analog and digital circuitry necessary for a fully integrated device with a single digital interface (such as a I²C, but not limited to such) to a host computer system. The circuitry includes a sample and hold circuit 4015 (for a selected row), along with an amplification with noise cancellation circuit 4021, an analog voltage digitization circuit 4022, a thermal compensation circuit 4023, a digital capture register 4024, a full array buffer 4025, and a component for transfer to a host computer 4026. The magnetic sensor array device 4001 has a sensor readout stage 4041 and a sensor response stage 4031.

In the serial pipelined measurement method, an entire magnetic sensor array row is selected and biased with current (or voltage bias depending the sensor design) and then the magnetic field induced analog voltage (or current converted to a voltage) for the selected row is captured in a sample and hold analog register decoupling the sensor response stage from the sensor readout stage and allowing the selected row to be incremented to the next row before the current row is readout. This pipeline stage allows the current sensor row to be read out (amplified with noise cancellation, digitized, thermally compensated and captured in digital registers) while the next sensor row is selected and biased with current (or voltage) and responds to the magnetic field with an induced analog voltage (or current).

This pipelined process repeats row by row until the entire magnetic sensor array is measured. After each row is read out, the magnetic field measurement result can be transferred immediately to a host computer over a digital interface or buffered in an on-chip memory until the entire array is read out before being bulk transferred to a host computer over a digital interface.

It can also be noted from FIG. 4 that the sample and hold circuit 4015 can be placed at other points in the readout pipeline or duplicated at multiple points in the readout pipeline to optimize measurement time. For example, the sample and hold circuit could be placed before the amplification stage (as shown) or after the amplification stage (not shown) or both before and after the amplification stage (not shown).

The serial and serial pipelined measurement methods are summarized in Table 2 for an example 8-row×8-column magnetic sensor array having a sensor response time and sensor readout time approximately equal. In the example the serial pipelined measurement method provides a total magnetic sensor array measurement time speedup of two times the serial measurement method while maintaining the same current to bias the sensors as the serial measurement method.

TABLE 2

| | Serial Measurement Method | | Serial Pipelined Measurement Method | |
|---|---|---|---|---|
| Step | Sensor Response | Sensor Readout | Sensor Response | Sensor Readout |
| 1 | Row 1 | — | Row 1 | — |
| 2 | — | Row 1 | Row 2 | Row 1 |
| 3 | Row 2 | — | Row 3 | Row 2 |
| 4 | — | Row 2 | Row 4 | Row 3 |
| 5 | Row 3 | — | Row 5 | Row 4 |
| 6 | — | Row 3 | Row 6 | Row 5 |
| 7 | Row 4 | — | Row 7 | Row 6 |
| 8 | — | Row 4 | Row 8 | Row 7 |
| 9 | Row 5 | — | — | Row 8 |
| 10 | — | Row 5 | | |
| 11 | Row 6 | — | | |
| 12 | — | Row 6 | | |
| 13 | Row 7 | — | | |
| 14 | — | Row 7 | | |

TABLE 2-continued

| | Serial Measurement Method | | Serial Pipelined Measurement Method | |
|---|---|---|---|---|
| Step | Sensor Response | Sensor Readout | Sensor Response | Sensor Readout |
| 15 | Row 8 | — | | |
| 16 | — | Row 8 | | |

Parallel Pipelined Measurement Method

As was described earlier it is possible to speed up the serial measurement method by dividing the magnetic sensor array into parts with each array part having a dedicated readout channel (amplifier, digitizer, compensation, capture) that enables each selected sensor row in each array part to be measured in parallel. This parallel measurement mode can be further speed up when each array part is measured using the serial pipelined measurement method instead of the serial measurement method.

In the example shown in FIG. 5, the magnetic sensor array is divided into two parts with each array part measured in parallel using the serial pipelined measurement method.

Shown in FIG. 5 is two, two-dimensional magnetic sensor arrays 5011a and 5011b that may be arranged in rows and columns (not shown) along with all the analog and digital circuitry necessary for a fully integrated device with a single digital interface (such as a I²C, but not limited to such) to a host computer system for each two-dimensional magnetic sensor arrays is provide. The circuitry includes a sample and hold circuits 5015a, 5015b (for a selected row), along with amplification with noise cancellation circuits 5021a, 5021b, analog voltage digitization circuits 5022a, 5022b, thermal compensation circuits 5023a, 5023b, digital capture registers 5024a, 5024b, full array buffers 5025a, 5025b, and components for transfer to a host computer 5026a, 5026b. The magnetic sensor array device 5001 has a sensor readout stage 5041 and a sensor response stage 5031.

As discussed earlier, the parallel pipelined measurement method can be extended by dividing the array into an arbitrary number of parts each having a dedicated readout channel with the speedup equivalent to the number of parts. For any of these parallel measurement methods, the parallel pipelined measurement method provides a measurement time speedup over the parallel measurement method of approximately two times which is illustrated in Table 3.

The parallel and parallel pipelined measurement methods are summarized in Table 3 for an example 8-row×8-column magnetic sensor array having a response time and readout time approximately equal. In the example where the array is divided into two parts with a dedicated readout channel for each part. The parallel pipelined measurement method is approximately twice as fast as the parallel measurement method.

TABLE 3

| | Parallel Measurement Method | | Parallel Pipelined Measurement Method | |
|---|---|---|---|---|
| Step | Sensor Response | Sensor Readout | Sensor Response | Sensor Readout |
| 1 | Row 1,5 | — | Row 2,6 | Row 1,5 |
| 2 | — | Row 1,5 | Row 3,7 | Row 2,6 |
| 3 | Row 2,6 | — | Row 4,8 | Row 3,7 |
| 4 | — | Row 2,6 | — | Row 4,8 |
| 5 | Row 3,7 | — | | |
| 6 | — | Row 3,7 | | |

TABLE 3-continued

| | Parallel Measurement Method | | Parallel Pipelined Measurement Method | |
|---|---|---|---|---|
| Step | Sensor Response | Sensor Readout | Sensor Response | Sensor Readout |
| 7 | Row 4,8 | — | — | — |
| 8 | — | Row 4,8 | — | — |

Staggered Sensor Layout Optimization

Disclosed is a method to enable higher density integration of magnetic sensors in the array of a magnetic sensor array device by staggering the magnetic sensors in either rows or columns. This staggered magnetic sensor arrangement provides a more uniform two-dimensional spatial resolution over the surface to be measured and higher density per magnetic sensor per unit area that benefits both measurement accuracy and manufacturing cost of the device.

Looking at the magnetic sensor array device in FIG. 1, it is evident that the individual magnetic sensors 1007, e.g., are arranged in horizontal rows (1-R1-1-R8) and vertical columns (1-C1-1-C8) where each sensor in a row is aligned horizontally with every sensor in the same row and each sensor in a column is aligned vertically with every sensor in the same column. This inline row and inline column arrangement of magnetic sensors can be modified to stagger every other sensor in the same row (staggered row) or every other sensor in the same column (staggered column).

The staggered row arrangement 6011A is shown in FIG. 6A and the staggered column arrangement 6011B is shown in FIG. 6b. The stagger in the row, 6A-R1A and 6A-R1B in FIG. 6A or in the column, 6B-C1L and 6B-C1R in FIG. 6B, for example, introduces a spatial offset in the position of each sensor to the adjacent sensor in the next row (staggered row) or next column (staggered column) as illustrated. In the staggered row arrangement in FIG. 6A, the columns, 6A-C1 and 6A-C2, for example, remain inline, but the rows, 6A-R1A and 6A-R1B in FIG. 6A, for example, are staggered with half the sensors spatially offset above and half the sensors spatially offset below. In the staggered column arrangement shown in FIG. 6B, the rows, 6B-R1A and 6B-R2A, for example, remain inline, but the columns, 6B-C1L and 6B-C1R, for example, are staggered with half the sensors spatially offset left and half the sensors spatially offset right.

The benefit of the staggered arrangement of magnetic sensors over the inline arrangement is that it produces a uniform center to center spacing from any sensor to any adjacent sensor. The uniform spacing among all the magnetic sensors in the array produces a more spatially uniform magnetic field measurement. It also produces higher magnetic sensor density per unit area enabling more efficient use of the semiconductor wafer area and lower manufacturing cost.

FIG. 7 illustrates a magnified view of an inline row and inline column arrangement of magnetic sensors, 7011, 7021-7028 that are spaced 100 µm center-to-center (100 µm spacing only for illustration), i.e., 100 µm center-to-center measured horizontally 7031-7036, and 100 µm center-to-center measured vertically 7041-7046. Thus, for magnetic sensors 7011, 7021, 7022, and 7024, the center-to-center horizontal measurements 7031 and 7033 are 100 µm, and the center-to-center vertical measurements 7041 and 7042 are 100 µm between the four orthogonal neighbors, but the center-to-center diagonal measurement 7051 between magnetic sensors 7021 and 7011 is 142.42 µm, which would be the same between 7022 and 7024 (not shown). This inline arrangement produces a square area measured across four sensor centers of 100 µm×100 µm=10,000 µm$^2$ or an average area per sensor of 2500 µm$^2$.

FIG. 8 illustrates a magnified view of an inline row and staggered column arrangement (corresponding to FIG. 6B) of magnetic sensors, 8011, 8021-8027 that are uniformly spaced 8041-8046 at 100 µm center-to-center from any sensor to any adjacent sensor. This staggered arrangement produces, for magnetic sensors 8011, 8021, 8027, 8026, for example, a parallelogram area measured across four sensors centers, 8036, 8037, 8041, 8043 of 86.6 µm×100 µm=8660 µm$^2$ or an average area per sensor (for the four sensors) of 2165 µm$^2$. The same is true of the staggered row and inline column arrangement (corresponding to FIG. 6A of magnetic sensors and can easily be seen by rotating the arrangement in FIG. 8 clockwise by 90 degrees. Distances 8031, 8033, 8034, 8035, 8037 are the same as 8036 by symmetry. Distances 8051 and 8052 are 86.8 µm for this example.

The completely uniform spatial characteristics with reduced area per sensor of the staggered layout optimizes the magnetic sensor array device in terms of magnetic measurement uniformity and manufacturing cost for an equivalent number of sensors in the array.

Calibration Process Optimization

In order to make highly accurate magnetic field measurements using sensors based on semiconductor technology (like Hall effect sensors), the temperature distortion of the magnetic field measurement must be eliminated. This is accomplished by adjusting the measured magnetic field result using a mathematical formula (thermal compensation algorithm) and input parameters (thermal compensation parameters) based on the sensor's thermal performance across the operating temperature range.

The type of thermal compensation algorithm and compensation parameters are both determined by experimentation during the development of the sensor by testing the sensor performance across the operating temperature range to find a combination of algorithm and parameters that eliminate the thermal distortion on the magnetic field measurement. The parameters will be unique for each chip so a method is required to calibrate each individual chip during manufacturing test to determine its unique parameters and store them in a location where they can be retrieved and used when it is time to perform a thermal compensation on a magnetic field measurement.

Illustrated in FIG. 9 is an authentication measurement system 9001. The magnetic sensor array device 9011 of FIG. 1 is assembled onto a printed circuit card 9021 and interfaced 9061 with a host system controller 9041 on a printed circuit card 9081 over a digital interface such as a I$^2$C interface block 9054. The host system controller 9041 manages the magnetic field measurement process by instructing the magnetic sensor array device 9011 to make a magnetic field measurement and when complete it retrieves the data from the device. The host system controller 9041 has a microcontroller 9051, a memory 9052, a network interface 9053, and a display 9055. The host system controller 9041 may also interface with cloud or other network connected storage 9071 through any available connectivity path 9062.

In order make this thermal compensation on the magnetic field measurement, the hardware on the chip or software running on the host system controller needs: (1) the thermal compensation algorithm (programmed in the hardware or software); (2) the thermal compensation parameters (measured and associated with an individual chip at manufacturing time); and (3) the actual temperature on-chip at the time of the measurement (read from a thermal diode(s) on-chip). Disclosed are methods to store and associate the thermal compensation parameters with each chip when it is manufactured so the parameters can be retrieved and used to perform a thermal compensation on a magnetic field measurement.

The first method is to store the unique thermal compensation parameters in a non-volatile memory (NVM) on the chip 9015 so that the parameters are included with each chip. When it is time to perform a thermal compensation, the hardware or the software can read the parameters from the on-chip NVM and use them to perform the thermal compensation as previously described. The on-chip thermal diodes can be placed by each cell but this would take too much space so typically they are placed to cover regions. For example, the quadrants designated by 1051 and 1055 may only have one on chip thermal diode for each of these areas. Each of these diodes would need to have calibration curves stored to correctly compensate the IC.

Storing the compensation parameters in an on-chip NVM 9015, however, adds device cost because the NVM semiconductor process requires additional mask layers and manufacturing time, as well as reduces yield of good devices. This additional cost can be significant for a large magnetic sensor array which requires a large NVM to store the parameters. The second and third methods discussed below reduce or eliminate this cost by storing the compensation parameters off-chip 9031 on a PCB 9021 as shown in FIG. 9.

The second method stores the thermal compensation parameters off-chip in a very low-cost discrete NVM device 9031 that is paired with the magnetic sensor array device by physical and/or logical association. Physical association is accomplished by including both the magnetic sensor array device and its associated NVM together by packaging the two devices together in shipping package or by assembling them into a multi-chip module (MCM). Logical association is accomplished by writing the unique serial number (burned into electronic fuses at manufacturing) of the magnetic sensor array into the NVM and vice-versa if desired.

The physical and/or logical association enables both the magnetic sensor array device and the discrete NVM to be assembled onto a common sensor printed circuit card 9021 as shown in FIG. 9. When it is time to perform a thermal compensation, the hardware or the software can read the parameters from the discrete NVM and use them to perform the thermal compensation as previously described.

The third method stores the thermal compensation parameters off-chip in a cloud database 9071 that is indexed by the unique serial number (e.g., burned into electronic fuses at manufacturing) of the magnetic sensor array. To perform the thermal compensation, the magnetic sensor array serial number is read by the host system controller and used as an index to read the parameters for that specific device from the cloud database or from a locally buffered version of the cloud database in a memory 9052 on the host system controller 9041. The thermal compensation parameters are then used by the hardware or the software to perform the thermal compensation as previously described.

The fourth method applies a compression algorithm (such as run length encoding but not necessarily limited to such) to the thermal compensation parameters before storing the parameters on-chip in a memory 9015 integrated with the sensor array or off-chip in a discrete memory device 9031 or off-chip in a cloud database 9071. When the thermal compensation algorithm is executed on-chip with the sensor array, the compressed parameters can be decompressed on-chip (in hardware or software) before they are used as input to the thermal compensation algorithm (executed in hardware or software). When the thermal compensation algorithm is executed off-chip, the compressed parameters can be decompressed off-chip (in hardware or software) before they are used as input to the thermal compensation algorithm (executed in hardware or software).

The fifth method reduces the total storage by sharing the same thermal compensation parameters across multiple sensors. Ideally each sensor will have its own thermal calibration parameters, but in the case where sensors are closely packed together on a common semiconductor substrate the thermal variation in the sensor performance may not vary greatly in local areas of the semiconductor. This means that the thermal compensation parameters can be shared across multiple sensors located in the same region without impacting the quality of magnetic field measurement result due to thermal variation.

There are many possible methods for sharing the same thermal compensation parameters across multiple sensors so the following examples should not be considered exhaustive. For example, all 3-axis sensors in the same pixel (where a pixel is defined to be the combination an x-axis sensor and a y-axis sensor and a z-axis sensor) could share the same thermal compensation parameters which would reduce the required thermal compensation data by a factor of three (i.e., to one-third). Likewise, each sensor axis could share the same thermal compensation parameters with the adjacent sensor of the same axis which would reduce the calibration data by a factor of nine (i.e., to one-nineth). There are many other methods to share the same thermal compensation parameter across multiple sensors that should be obvious to one of ordinary skill in the art.

Using any of these storage methods, the thermal compensation parameters can be associated with each magnetic sensor array device individually and when used by the compensation process, the magnetic field measurements from each individual magnetic array device is made intolerant to thermal distortion. The compensation parameters for the thermal distortion will be compressed to save space and cost of the NVM. This compression can take many forms, but the preferred methods would be to fit the compensation curves by low order polynomials for each region around a thermal diode sensor. The preferred polynomial would be a third-order system but can be reduce to a second-order system in instances where a lower accuracy is acceptable. The inputs would be the relative locations of the sensors relative to each of the individual magnetic sensors 1007 and the output would be the offset of the temperature compensation due to location.

Another compensation technique would be dynamic compensation for real-time heating that takes place when each magnetic sensor 1007 location is energized. The heat transfer is modeled by state machine with a thermal time constant and forcing function for each time the sensing element 1007 is energized. The preferred state machine predicts next temperature $x(t+1)$ at a sampled time to be current temperature state $x(t)$ times the cooling coefficient "A" plus the forcing function $u(t)$ that is proportional to the heat added to the system due to the Hall effect plate bias current. The cooling coefficient "A" and forcing function $u(t)$ would be common values for most of the interior elements but would different for elements near the edges. The NVM would also contain compensation for the amplifiers and digitizers.

These values would also need to be compressed by a similar curve fitted polynomial to compensate for both linear and higher order affects.

Adaptive Resolution Sequence Map

In another embodiment, the positional resolution of the sensor is used to control the response time of the sensor depending on the read situation. For example, if the sensor is being positioned over the target then a faster/lower resolution read is needed to confirm that the rim of the sense area has a significant field compared to the interior. Another example is for situations where the overall resolution could be lower over the whole sensor. The sensor receives a command sent to set the scan mode; simple scan modes could have a skip number to advance the scan index sequence. If the skip is set to 0, then all the cells are read as discussed above. If the skip is set to 1, then every other cell is measured. The command may also limit the measurement to a particular magnetic field direction read to increase the speed of the response. During the positioning of the sensor only one direction is needed.

If a low resolution read is performed and the authentication is narrowed to a subset of possible patterns, then a second read is needed at higher resolution for predetermined locations. A method to allow fast arbitrary path reads is needed. One method is to create a mask that is formed in memory to determine the locations and directions to read for a skip. Another method is to have a command sequence that routes the read direction and locations. Table 4 shows a number of commands that sequences the read locations in a predetermined order. The initial location may be at X and Y locations 0 and 0 respectively or any location set by another command. The Field Direction ("FD") part of the command is the directions of the magnetic field to be measured. The Next Read Direction ("NRD") is the direction to move in the X or Y direction (positive or negative) with respect to the current location. The Index Count ("IC") is a binary number ranging from 0 to 15 that represents a move of 1 to 16 locations, respectively, in the direction indicated by NRD.

TABLE 4

Command to sequence sensor read locations

| Signal Name | Description | Default | Notes |
|---|---|---|---|
| FD | [2:0] Field direction<br>000: skip,no measurement<br>001: Bz<br>010: By<br>011: By & Bz<br>100: Bx<br>101: Bx & Bz<br>110: Bx & By<br>111: Bx & By & Bz | 001 | |
| NRD | [1:0] Next read direction<br>00: −Y<br>01: +Y<br>10: −X<br>11: +X | 11 | |
| IC | [3:0] Index count<br>N + 1 | 00 | Step size is count<br>IC + 1 |

One skilled in the art would recognize that any number of indexing methods may be created to move within the measurement area.

Security Measures

The authentication system, shown in FIG. 9, consists of a reader device 9001 (consisting of a host system controller 9041 integrated circuit and memory 9052 and/or network connection 9053 and/or user interface 9055) connected to a magnetic sensor array device 9011 over a digital interface 9061. The sensor integrated circuit ("IC") should use secure cryptographic methods to protect the information being sent to and from the sensor IC and the reader device. These methods may include cryptographic protocols for device authentication, data integrity and data confidentiality.

To support these cryptographic methods, FIG. 10 shows the sensor IC 10021 should be provisioned at the factory with a public/private key pair and/or a secret key and/or one or more digital certificates and/or a reader secret key that may be stored in the sensor IC non-volatile memory or electronic fuses and be used to protect the information and force each sensor to be paired with the reader system at the factory. The reader host system controller 10011 may also be similarly provisioned with encryption keys and digital certificates.

The sensor IC 10021 may be authenticated by the reader, 10011 (one-way device authentication) by using a standard asymmetric authentication protocol with a public/private key pair 10015 and/or a digital certificate 10016 or by using a standard symmetric authentication protocol and shared secret key and/or a digital certificate where the keys and certificates are stored in the sensor IC when provisioned. In addition, the reader may be authenticated by the sensor IC (two-way mutual authentication) using either a standard asymmetric or symmetric protocol and keys and/or certificates as just described. This system is illustrated in FIG. 10.

After the sensor IC has been authenticated by the reader, a second factor authentication may be used to verify that a specific reader and a specific sensor IC have been cryptographically paired together when assembled at the factory. The pairing is verified by using a standard or non-standard challenge/response protocol 10017 that proves that the sensor IC has possession of the reader secret key that it was provisioned with at the factory. This is also illustrated in FIG. 10.

As illustrated in FIG. 11, after the sensor IC 1111 and reader/sensor IC 1121 pairing has been authenticated, the system may be considered genuine, but the data transferred across the interface may be further secured from tampering through the use of a standard message authentication code ("MAC") or digital signature ("DS"). To support data integrity 1131, the sensor IC may support the generation and verification of message authentication codes and/or digital signatures 1151 for some or all types of data transmission using a shared secret key ("SK") stored in each device or derived using a secret key derivation algorithm.

Additionally, the data transferred across the interface may be secured from eavesdropping by the use of standard encryption. To support data confidentiality 1141 the sensor IC may support standard symmetric or asymmetric encryption and decryption 1161 for some or all types of data transmission using a shared secret key ("SK") stored in each device or derived using a secret key derivation algorithm.

The transfer to host computer component found in FIGS. 2 (2026), 3 (3026a, 3026b), 4 (4026), and 5 (5026a, 5026b) is the component that authenticates, encrypts or decrypts, and verifies the information. This block can be integrated into the same IC as the sensor, or it can be a separate IC that is packaged together with the sensor IC in a multi-chip module. Finally, one of ordinary skill in the art would recognize that any number of cryptographic protocols, cryptographic ciphers, and key generation and derivation methods may be used in the sensor IC to provide the features described.

Further, the sensor may also incorporate other tamper detection methods including thermal, voltage, or frequency variation to suspend operation. The IC may have a detector that requires some minimum amount of magnitude and direction variation before a reading can commence. This would make it difficult to probe during operation for an attack method. For example, there must be at least ten different areas on the sensor with a minimum field level of 0.5, 1, 2, 4, 8 or 16 gauss depending on the application. The threshold level set at the factory makes certain that the sensor is in the presence of a PUF before full operation may be established. A challenge and response password system would allow a number of attempts to communicate with the sensor before the interface is permanently disabled.

The use of the sequential read map as discussed above is another method to allow each reader to protect the data flow. The reader does not know in advance what areas are of interest until the command initializes the reader, and the data of the commands and return data are also encrypted. This has the added advantage that the communication links are secure from unintentional radiated emissions of the system. This would be a counter-measure to reading a fixed quantity from the sensor to the reader giving a repeated answer.

Hybrid Magnetic Camera

A further invention shown in FIG. 12 is made by arranging the central regions of an Integrated Circuit (IC) with an N-row×M-column array ("N" along the Y-axis and "M" along the X-axis 1201, according to the coordinate-directions 1211) that are preferred to be horizontal Hall effect plates 1251 that measure the Z-directed magnetic field component Bz only. Each central square is a Hall effect plate 1251 that is used to measure the Bz. The Bx and By components can be computed in the interior region using known techniques. At the outer edge of the Bz measurement region additional Hall effect elements 1231, 1241, for example, are arranged to measure the Bx and By components by using vertical elements, a method that is known in the art. The area in the dashed box 1261 that show one arrangement of vertical and horizontal Hall effect elements that create a 3D (three-dimensional) measurement.

U.S. patent application Ser. Nos. 17/012,456; 17/012,474; and 17/012,483, each titled "A Sensor Array for Reading a Magnetic PUF," arranged all of the elements in the array to be 3D elements. U.S. Pat. No. 7,902,820 titled "Method and Apparatus for Detecting Spatially Varying and Time-Dependent Magnetic Field," for example, has an array on the interior that is horizontal only.

The improvement here is to only add the vertical Hall effect plates for Bx and By around the perimeter giving the needed field values in the in plane direction. The drawing in FIG. 12 is not necessarily drawn to scale. For example, the interior Hall effect plates may be much closer together if desired. It is also not a requirement that each Bz element 1251 have a Bx element 1231 or By element 1241 around the edge. The vertical Hall effect plate density only needs to be enough for the resolution needed for the application. The minimum vertical Hall effect plates per side would be one for Bx and one for By. The preferred number would be N×(Bx and By) sensors per Y direction and M×(Bx and By) sensors per X direction.

In another embodiment shown in FIG. 13, the horizontal Hall effect plates to measure Bz 1311, for example, are covered by a magnetic concentrator 1311 over the edge plates only 1312, 1321 for example. The drawing is not drawn to scale and the interior plates 1311, for example, may be in far greater numbers than shown. The coordinate system 1301 shows that the Bz direction is perpendicular to the surface of Hall effect plate 1311. The technique was shown in the prior art for a single measurement element. The concentrator may also be a square ring over the outer rows and columns of the array. The concentrator in this case diverts Bx and By field components and creates a low reluctance path to divert the flux through edge horizontal Bz Hall effect plates. In this implementation the Bx and By are estimated by taking the difference between the reading of the ring location and the adjacent Hall effect plate just inside the ring. This is fundamentally different than the assumptions made in the prior art that assume that the field is uniform over the surface of the entire sensor. The assumption here is that the field is similar over two adjacent cells.

In another embodiment, FIG. 14 shows an array 1401 of 15×15 Hall effect plates 1421, for example, with concentrator rings 1441, for example, around the edge Hall effect plate elements 1431, for example, to extract the Bx and By pre-referral field components. This is preferred arrangement over the design in FIG. 13.

A person of ordinary skill in the art would understand that the presented arrays, sizes, and ratios of sizes of the elements are only limited by the silicone features of the processes.

Array Readout Optimizations

U.S. patent application Ser. No. 17/012,456 disclosed methods to decrease the measurement time of the multi-axis monolithic magnetic sensor array by measuring sensors of one or more axes located in one or more columns and in one or more rows at the same time and then incrementing through the remaining axes, columns, or rows one or more at a time until the entire magnetic sensor array has been measured.

The readout methods disclosed in U.S. patent application Ser. No. 17/012,456 can be categorized as follows:
  Serial Axis, Serial Row, Serial Column Readout Mode
    a. One sensor axis readout at a time
    b. One sensor row readout at a time
    c. One sensor column readout at a time
  Serial Axis, Serial Row, Parallel Column Readout Mode
    a. One sensor axis readout at a time
    b. One sensor row readout at a time
    c. Multiple sensor columns readout at a time
  Serial Axis, Parallel Row, Serial Column Readout Mode
    a. One sensor axis readout at a time
    b. Multiple sensor rows readout at a time
    c. One sensor column readout at a time
  Serial Axis, Parallel Row, Parallel Column Readout Mode
    a. One sensor axis readout at a time
    b. Multiple sensor rows readout at a time
    c. Multiple sensor columns readout at a time
  Parallel Axis, Serial Row, Serial Column Readout Mode
    a. Multiple sensor axes readout at a time
    b. One sensor row readout at a time
    c. One sensor column readout at a time
  Parallel Axis, Serial Row, Parallel Column Readout Mode
    a. Multiple sensor axes readout at a time
    b. One sensor row readout at a time
    c. Multiple sensor columns readout at a time
  Parallel Axis, Parallel Row, Serial Column Readout Mode
    a. Multiple sensor axes readout at a time
    b. Multiple sensor rows readout at a time
    c. One sensor column readout at a time
  Parallel Axis, Parallel Row, Parallel Column Readout Mode
    a. Multiple sensor axes readout at a time
    b. Multiple sensor rows readout at a time
    c. Multiple sensor columns readout at a time FIG. 15 illustrates a multiple sensor readout method by organizing the multi-axis magnetic sensor array into banks of multi-axis sensor columns and banks of multi-axis sensor rows that can be readout at the same time. This example (64 rows×16 columns per bank 1535) should not be limiting as any readout combination of one or more axis, one or more rows or one or more columns would be obvious to one skilled in the art.

To readout this example of a 128 row×128 column×3 axis magnetic sensor array 1501, one or more axis (X and/or Y and/or Z) is selected 1521 as the first axis or axes, then one or more row is selected 1525, 1523 and then more than one column is selected 1527, 1529. For example, the X-axis is selected as a first axis and the first row in the upper 64 row array half 1560 is selected and the first row in the lower 64 row array half 1562 is selected (2 rows total) and the first 16 columns in each selected row (i.e., "Bank 0" 1536 and "Bank 8" 1538) are selected through 1531, 1533 for a total of 32 sensors selected for readout at the same time. These are then read through ARRAY READOUT CHANNELS 1527, 1529.

The readout of the array continues by moving to the second bank of 16 columns (i.e., "Bank 1" 1540 and "Bank 9" 1542) in the two selected rows (one upper array half 1560, one lower array half 1562) and reading out those 32 sensors at the same time. Readout continues across each of the 8 banks of 16 columns in the two selected rows (one upper array half 1560, one lower array half 1562) until the last bank of 16 columns (i.e., "Bank 7" 1537 and "Bank 15" 1544) of the two selected rows (one upper array half 1560, one lower array half 1562) are readout at the same time.

The readout continues by selecting the second row in the lower 64 row array half 1560 and second row in the upper 64 row array half 1562 and readout the 8 banks of 16 columns in a similar manner. This process continues until each row in the lower 64 row array half 1560 and each row in the upper 64 row array half 1562 are selected and each of the 8 banks of 16 columns are readout in a similar manner for the entire array.

The readout continues moving to the Y-axis as a second axis and selecting and reading out those sensors in banks of columns and rows as previously described. The readout continues moving to the Z-axis as a third axis and reading out those sensors in banks of columns and rows as previously described. Any X-axis, Y-axis, or Z-axis order for a serial axis readout and any X-axis, Y-axis, or Z-axis combination for a parallel axis readout should be obvious to one skilled in the art.

Each sensor selected must be digitized from the analog measurement to a digital value with a readout channel consisting of at least an amplifier and digitizer. With magnetic sensors, the output is typically a very small voltage requiring amplification before digitization. The amplifier can be programmed to allow different gains which will set the scale of the analog signal. The digitation is accomplished by an analog to digital converter (A-to-D).

A preferred approach would be to have multiple readout channels to allow readouts in parallel to decrease readout times. One logical combination is to have one readout channel for each of the 16 columns in a bank for each selected row, where one or more rows are selected as shown in FIG. 15. This would allow multiple sensors in each bank to be read out in parallel reducing the read time by a factor of 16 for this example. Each readout channel can be output as parallel data or serialized to reduce the signal lines needed to transmit the digital output data.

This description is merely illustrative of a single example as any combination of sensors and readout channels can be selected by axis, row and column for parallel readout as should be apparent to one skilled in the art.

Variable Spatial Resolution Optimization

U.S. patent application Ser. No. 17/193,554 disclosed an adaptive resolution sequence map to provide a means to measure one or more axes of a magnetic field over an arbitrary path with variable spatial resolution. This enables a lower spatial resolution measurement to be made with higher speed or a higher spatial resolution measurement to be made with lower speed. Both the memory mask and command sequence methods disclosed in U.S. patent application Ser. No. 17/193,554 require on-chip memory to hold the mask data or command instructions. This disclosure introduces an optimization by decreasing the amount of on-chip memory needed to provide adaptive spatial resolution while reducing or minimizing the readout time through readout channel parallelism of the amplifiers and digitizers.

Consider the multi-axis magnetic sensor array shown in FIG. 15, that is 128 rows×128 columns×3 axes. The full memory mask method disclosed in U.S. patent application Ser. No. 17/193,554 requires an on-chip memory that is 48 Kb (128×128×3 bits). It is desirable to reduce the size of the on-chip mask memory (and chip cost) while still providing variable spatial resolution. The method to reduce the size of the mask memory is to use a one-or-more axis mask and/or a one-or-more column mask and/or a one-or-more row mask, all disclosed as follows.

Axis Mask Method

The one-or-more axis mask method consists of a means to selectively mask one-or-more axis from the array readout. One embodiment (of many) of this method consists of a two-bit register defined with the following encoding:

00—undefined
    01—Z-axis readout only
    10—X, Y axis readout only
    11—X, Y, Z axis readout To selectively mask any axis from readout, this register is configured prior to an array measurement and can be changed from measurement to measurement. It should be clear to one skilled in the art that any number of register bits can be combined to produce any mask combination of X-Y-Z-axis readouts.

Row Mask Method

The one-or-more row mask method 1601 consists of a means to selectively mask one-or-more rows from the array readout. One embodiment (of many) of this method consists of the following one-or-more bit long registers shown in FIG. 16: ROW SELECT 1639, ROW ADD1 1611, ROW SKIP 1633, and ROW ADD2 1622. To selectively mask any row from readout, these registers are configured with a one-or-more bit value (0 to N) prior to an array measurement and can be changed from measurement to measurement.

The mask for the row is calculated by starting the readout at the row selected by the value programmed into the ROW SELECT register 1639. The next row is selected by the addition of the current value in the ROW SELECT register 1639 and the value programmed into the ROW ADD1 1611 register, and also added with the value programmed into the ROW ADD2 1622 register if the current value of the ROW SELECT register 1639 equals the value programmed into the ROW SKIP register 1633. The row mask calculation pseudocode flow is shown in 1635 which may be executed by hardware or software integrated in the magnetic sensor array device. In this pseudocode flow 1635, there is a pseudocode branch 1637 that is executed in a loop until all the row measurements are complete. The selected rows are measured in the sensor array 1641. This is illustrated in FIG. 16.

It should be clear to one skilled in the art that any number of register bits that define any value can be combined with any arithmetic or logic calculation to produce any calculated mask of row readouts.

Similarly, multiple row mask register sets can be provided for array organizations where the rows are divided into sections as illustrated by the upper array row half 1560 and lower array row half 1562 in FIG. 15. Here, two row mask registers with independent calculations would provide a unique row mask for the upper array half 1560 and a unique row mask for the lower array half 1562. Clearly, this could be extended indefinitely to cover as many unique row sections as desired (e.g., four row mask registers sets and calculators for arrays that are divided into row quarters, etc.).

Column Mask Method

The one-or-more column mask method 1701 consists of a means to selectively mask one-or-more columns from the array readout. One embodiment (of many) of this method consists of a programmable mask code memory 1713 shown in FIG. 17 that contains one-or-more variable length N-bit mask register codes and optionally one-or-more variable length M-bit mask register bank codes. In addition, there are 1 to $2^M$ mask register banks 1719 each consisting of 1 to $2^N$ mask registers 1721 each with a variable length of one-or-more bits. To selectively mask any column from readout, these registers and memory are configured prior to an array measurement and can be changed from measurement to measurement.

The mask register bank 1719 is selected 1725 by the decoded value 1717 of the (optional) variable length M-bit mask code read from the mask code memory 1713 (e.g., a 2-bit long M-bit code selects 1 of 4 mask register banks) OR 1715 by a fixed M-bit mask code 1711 described later. The mask register within the selected bank is then selected 1727 by the decoded value 1717 of the variable length N-bit mask code read from the mask code memory 1713 (e.g., a 3-bit long N-bit code selects 1 of 8 mask registers).

Each bit of data in selected mask register 1721 is used as a bit mask for a corresponding column in the array. If the bit mask is 0, the column is masked (skipped) from readout and if the bit mask is 1, the column is selected (included) for readout. (Note: a '1' can also be used for a bit mask and a '0' can be used for a bit select.) When the number of mask bits in the mask register bank 1719 are used the next M-bit (optional) and next N-bit mask code is read from the mask code memory 1713 and the mask register selection process repeats, and sensors are masked or selected by column and by row for readout.

The N-bit mask codes are always included in the mask code memory 1713, but to save space in the mask code memory 1713, the M-bit mask codes are optional. If the M-bit mask codes are not included in the mask code memory a fixed M-bit decode of the mask register bank 1711 is used. There are two types of the fixed M-bit mask codes 1711 used to select the mask register bank (both based on the array location 1725) as the following describes.

The first fixed M-bit mask code type 1711 is used when the number of mask register banks 1719 equals the number of array banks. Here the total number of array columns divided by the mask register length equals the number of mask registers banks (e.g., M=8 mask register banks=128 columns/16-bit mask register). In this case, the fixed M-bit decode incrementally selects mask register banks from 1-to-M (1731-to-1738) as the array readout proceeds incrementally from array bank 1-to-M (1741-to-1748) by banks of columns and by row. As earlier described, when the number of mask bits in the selected mask register 1721 are used there is an increment in the fixed M-bit decode 1711 to the next mask register bank. When the mask register bank reaches M (e.g., M=8) the next fixed M-bit decode of the mask register bank select wraps to mask register bank 1 1731 and continues incrementally to mask register bank M 1738 and repeats.

The second fixed M-bit mask code type 1711 is used when the number of mask register banks 1719 is less than the number of array banks. Here the total number of array columns divided by the mask register length is greater than the number of mask register banks. (e.g., Mx=2 mask register banks<128 columns/16-bit mask register). In this case, the fixed M-bit decode incrementally selects mask register banks from 1-to-Mx (1731-1732 e.g., where Mx=2) as the array readout proceeds incrementally from array bank 1-to-M (1741-to-1748) by banks of columns and by row. As earlier described, when the number of mask bits in the selected mask register 1721 are used there is an increment in the fixed M-bit decode 1711 to the next mask register bank. When the mask register bank reaches Mx (e.g., Mx=2) the next fixed M-bit decode of the mask register bank select wraps to mask register bank 1 1731 and continues incrementally to mask register bank Mx (1732 e.g., where Mx=2) and repeats.

Row and Column Mask Embodiments

This programmable column mask readout method can be further extended for banks of rows. For example, when an array is configured as shown in FIG. 15, there are 8 banks of columns by 2 banks of rows (lower half 1560 and upper half 1562). When there are more than one bank of rows, the programmable column mask method shown in FIG. 17 can be duplicated for each additional bank of rows so that each bank of rows has its own programmable column mask hardware.

There are many embodiments possible using the column mask method, some of which are described below, but these embodiments are not meant to be exhaustive, and others may be deduced by one skilled in the art.

Fixed Decode Single Bank Column Mask Embodiment

In this embodiment, the mask code memory 1713 only stores N-bit codes. The M-bit codes are produced by the fixed mask register bank 1711 decode hardware. In addition, there is one mask register bank (M=0b=>1) that contains 2 mask registers (N=1b=>2) where each mask register is 16b in length.

The fixed mask register bank 1711 decode selects mask register bank 0 and the first N-bit (1b) mask code read from the mask code memory is used to decode 1 of 2 mask registers in the selected bank. Each bit of the selected mask register (e.g., 0-15) is used to mask or select the corresponding column of the array moving left to right column by column (e.g., 0-15).

When the number of mask register bits (e.g., 16b) are consumed, the fixed mask register bank decode selects the next mask register bank (i.e., 0, means only one mask register bank) and the process repeats until all the mask register banks are selected moving incrementally by column bank and by row to mask or select all sensors in the array for readout.

Fixed Decode Multiple Bank Column Mask Embodiment

In this embodiment, the mask code memory 1713 only stores N-bit codes. The M-bit codes are produced by the fixed mask register bank 1711 decode hardware. In addition, there are 8 mask register banks (M=3b=>8) each containing 4 mask registers (N=2b=>4) where each mask register is 16b in length.

The fixed mask register bank 1711 decode selects mask register bank 0 and the first N-bit (2b) mask code read from the mask code memory is used to decode 1 of 4 mask registers in the selected bank. Each bit of the selected mask register (e.g., 0-15) is used to mask or select the corresponding column of the array moving left to right column by column (e.g., 0-15).

When the number of mask register bits (e.g., 16b) are consumed, the fixed mask register bank decode selects the next mask register bank (i.e., one) and the process repeats until all the mask register banks (i.e., eight) are selected moving incrementally by column bank and by row to mask or select all sensors in the array for readout.

Variable Decode Multiple Bank Column Mask Embodiment

In this embodiment, the mask code memory only stores M-bit and N-bit codes. In addition, there are 8 mask register banks (M=3b=>8) each containing eight mask registers (N=3b=>8) where each mask register is 16b in length.

The first M-bit (M=3b) and N-bit (N=3b) mask codes are read from the mask code memory and the M-bit (3b) code is used to select 1 of 8 mask register bank and the N-bit (3b) mask code is used to select 1 of 8 mask registers within the selected bank. Each bit of the selected mask register (e.g., 0-15) is used to mask or select the corresponding column of the array moving left to right column by column (e.g., 0-15).

When the number of mask register bits (e.g., 16b) are consumed, the next M-bit and N-bit mask codes are read from the mask code memory and used to decode the next mask register bank and mask register within the bank. The bits in the selected mask register are then used to mask or select the corresponding column for readout as previously described. The process repeats moving incrementally by column and by row until all sensors are masked or selected for readout.

Fixed and Variable Bank Row Mask Embodiment

Each of the three column mask embodiments (FIXED DECODE SINGLE BANK COLUMN MASK, FIXED DECODE MULTIPLE BANK COLUMN MASK, VARIABLE DECODE MULTIPLE BANK COLUMN MASK) can be further extended by duplicating the column mask hardware shown in FIG. 17 for each bank of rows in the array. This is not described here but it should be obvious to one skilled in the art based on the description of the previous embodiments.

Mask Pattern Illustrations

These embodiments can be used to create many mask patterns to reduce the power dissipation and readout time for each measurement. A few mask patterns are illustrated in FIGS. 18*a*-18*j* but the illustrations are not exhaustive. For example, there are multiple reduced resolution patterns possible.

Each mask pattern, 1801, for example, is illustrated with columns 1803 and rows 1805, along with corresponding mask code memory (1807*a*, e.g., see "MCM"), M-bit mask register bank (1807*a*, e.g., "M"), N-bit mask registers (1807*a*, e.g., "N"), and 8-bit long mask registers (1807*a*, e.g., "MR"). A blank space in the pattern diagram indicates a sensor is masked (skipped), see 1807*b*, e.g., and a X indicates a sensor is selected for readout, see 1817*b*, e.g. 1817*a*, 1827*a*, 1837*a*, 1847*a*, 1857*a*, 1867*a*, 1877*a*, 1887*a* and 1897*a* are the memory and registers values that result in masked patterns 1817*b*, 1827*b*, 1837*b*, 1847*b*, 1857*b*, 1867*b*, 1877*b*, 1887*b* and 1897*b* in FIG. 18B-18J respectively.

Many arbitrary sized mask patterns can be constructed based on the array size, number of rows, number of columns, number of columns in a bank, number of rows in a bank, M-bit size, N-bit size and mask register length size. These are not shown but should be obvious to one skilled in the art.

As previously described, each bank would require at least one readout channel (e.g., amplifier and analog to digital converter) to convert the sensor to a digital value. With one readout channel, there would be one read time for each bank row and column position. If N readout channels were present, then a bank could read N columns at a time. Switching can also be provided to allow readout channels to operate across multiple banks of sensors. The invention allows for unique bank mask hardware to be associated with each bank of columns and their readout channel, but it does not require it as bank mask hardware can be shared across multiple banks of columns and their readout channels.

Memory Requirement

One of the benefits of a programmable readout mask is the reduction in on-chip memory required to hold the mask. A few embodiments are shown below in Table 5 but are only illustrative and not exhaustive.

TABLE 5

Memory Requirement

| Array:<br>128 Rows × 128 Cols | Mask Code<br>Memory | Mask<br>Banks | Mask<br>Register/Bank | Total<br>Memory |
|---|---|---|---|---|
| Full Array Mask | 128 × 128b | — | — | 16384b |
| Fixed Decode | 128 × (0b + 1b) | 1 | 2-16b | 160b |
| Single Bank | 128 × (0b + 2b) | 1 | 4-16b | 320b |
|  | 128 × (0b + 3b) | 1 | 8-16b | 512b |
| Fixed Decode | 128 × (0b + 1b) | 4 | 2-16b | 256b |
| Multiple Bank | 128 × (0b + 2b) | 4 | 4-16b | 512b |
|  | 128 × (0b + 3b) | 4 | 8-16b | 1024b |
| Variable Decode | 128 × (3b + 1b) | 8 | 2-16b | 768b |
| Multiple Bank | 128 × (3b + 2b) | 8 | 4-16b | 1152b |
|  | 128 × (3b + 3b) | 8 | 8-16b | 1792b |

Variable Magnetic Scale

It is common for magnetic sensors available on the market today to be able to configure the magnetic range and resolution scale. This enables a higher range measurement to be made with a lower resolution (e.g., +/−100G range with 1G resolution) and a lower range measurement to be made with a higher resolution (e.g., +/−50 G with 0.1 G resolution, but not at the same time, and not automatically.

Considering the magnetic sensor array device shown in FIG. 15, it is desirable to measure the magnetic field with a different range and resolution scale for different locations across the array at the same time. The benefit of a variable measurement scale by location is that it enables higher magnetized location to be measured on a higher scale and lower magnetized locations to be measured on a lower scale at the same time.

The method to provide a variable magnetic scale that can arbitrarily vary across the array is to provide a manual (manual-scale) or automatic (auto-scale) magnetic range and resolution configuration for one-or-more sensors in the array either during (auto-scale) or between (manual-scale) measurements. This method provides the ability to make a mixed scale measurement across the array at the same time.

In one embodiment of manual-scale, an on-chip memory is programmed between measurements with one-or-more bits to set the range and resolution scale for each individual sensor in the array. For example, 0=low range and high resolution and 1=high range and low resolution although other arbitrary bit lengths could be used to provide an arbitrary number of scale combinations for range and resolution.

In another embodiment of manual-scale, an on-chip memory is programmed between measurements with one-or-more bits to set the range and resolution for every sensor in one bank. Consider the magnetic array sensor device in FIG. 15, there are 16 total banks so the on-chip memory can be reduced to a 16b programmable register where each of the 16 register bits is used to set the range and resolution scale for every sensor in each of the 16 banks. For example, 0=low range and high resolution and 1=high range and low resolution although other arbitrary bit lengths could be used to provide an arbitrary number of scale combinations for range and resolution. Many additional techniques may be used to reduce the size of the on-chip memory needed for the variable magnetic scale as were previously described for the axis, row, and column readout masking, but are not further described here.

In another embodiment of auto-scale, on-chip hardware is used during a measurement to set the range and resolution scale for each individual sensor in the array or for every sensor in one bank (e.g., FIG. 15). During a measurement, the on-chip hardware automatically detects if the measurement from a sensor is greater than or less than a programmable limit. If the measurement is outside the limit, the hardware automatically adjusts the magnetic range and resolution scale so the measurement from a sensor comes within the limit.

In another embodiment of auto-scale, on-chip hardware is used between measurements to set the range and resolution scale for each individual sensor in the array or for every sensor in one bank (e.g., FIG. 15). First a measurement is made on a low or high measurement scale, the data is examined by on-chip hardware and the sensors are reconfigured for another measurement scale based on analysis of the first measurement result.

The manual and automatic scaling can be achieved by modifying the gain of each channel amplifier or A-to-D stages. The scaling can also be modified digitally inside the A-to-D or by multiplying the digital output.

Secret Key Derivation

U.S. patent application Ser. No. 17/193,554 disclosed security measures that would protect the information being sent to and from the sensor integrated circuit chip and the reader device. These cryptographic methods depend on a secret key that must be derived using expensive asymmetric key exchange protocols based on public/private key infrastructure or less expensive symmetric key protocols based on a shared secret key.

The public/private key infrastructure eliminates the need to distribute shared secure keys between two devices seeking to communicate securely, but it requires more expensive hardware. It is desirable to use shared secret key based symmetric secure protocols if a shared secret key can be securely distributed. This invention discloses a method to securely distribute the shared secret key and eliminates the need for expensive asymmetric key exchange protocols.

The method to distribute the shared secret key securely is to use the device specific sensor array calibration data in whole or in part and/or the good/bad sensor data in whole or in part, either individually or combined algorithmically, to derive a secret key internal to the device. At a secure manufacturing environment at the chip factory the derived key and associated sensor array device serial number (burned into effuses) are transmitted over a secure network to a centralized database.

Subsequently, when the sensor array device is paired with a host compute device in a secure card manufacturing environment, the shared secret key is read from the centralized database over a secure network and programmed in a secure memory on the host compute device. The secure memory could be a Trusted Platform Module or a Secure Element that is fabricated with tamper proof hardware security features.

In the field, when the host compute device and magnetic sensor array device wish to form a secure channel for communication the secret key is securely retried by the host compute device from the secure memory using one of several methods (e.g., wrapping) and the secret is derived again internal to the sensor array device using the same key derivation algorithm used at the factory. The two devices now independently have possession of the shared secret key without the key ever being transmitted in the clear. Any number of shared secret key based symmetric cryptographic protocols can be used to establish a secure channel where data can be communicated in secret and without tamper.

In one embodiment, the device specific calibration data in whole or in part is used directly as the secret key.

In another embodiment, the device specific calibration data in whole or in part is used as input to a HASH function with the HASH output used as the secret key.

In another embodiment, the device specific good/bad sensor data in whole or in part is used directly as the secret key.

In another embodiment, the device specific the good/bad sensor data in whole or in part is used as input to a HASH function with the HASH output used as the secret key.

In another embodiment, the device specific calibration data in whole or in part and the good/bad sensor data in whole or in part are algorithmically combined and the result used as the secret key.

In another embodiment, the device specific calibration data in whole or in part and the good/bad sensor data in whole or in part are algorithmically combined and the result used as input to a HASH function with the HASH output used as the secret key.

Many other key derivation algorithms using the device specific calibration data in whole or in part and/or the good/bad sensor data in whole or in part are possible that would be obvious to one skilled in the art.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

We claim:

1. A method of more-than-one column readout by organizing a multi-axis magnetic sensor array into banks of multi-axis sensor columns and banks of multi-axis sensor rows that can be readout at the same time comprising:
    selecting one or more first axis or axes of the magnetic sensor array;
    selecting one-or-more rows of the magnetic sensor array;
    selecting more-than-one one column of the magnetic sensor array;
    continuing the readout of the magnetic sensor array by moving to a next bank of columns in the selected rows (one in an upper array half, one in a lower array half), and reading out the sensors in the bank at the same time;

selecting a next row in the lower row array half and second row in the upper row array half and reading out the sensors in the banks of columns;

continuing the process until each row in the lower row array half and each row in the upper row array half are selected and each of the sensors in the banks of columns are readout in a similar manner for the entire array; and digitizing each sensor selected from the analog measurement to a digital value with a readout channel consisting of at least an amplifier and digitizer.

2. The method of claim 1 where the process continues by moving to a second axis or axes and selecting and reading out sensors in banks of columns and rows.

3. The method of claim 2 where the process continues by moving to a third axis and reading out sensors in banks of columns and rows.

4. The method of claim 3 where multiple readout channels are used to allow readouts in parallel to decrease readout times.

5. The method of claim 4 where one readout channel is used for each of the columns in a bank for each selected row, where one or more rows are selected.

6. The method of claim 5 where each readout channel is output as parallel data or serialized to reduce the signal lines needed to transmit the digital output data.

7. A method of masking one-or-more axis consisting of selectively masking one-or-more axis from an array readout by configuring a register prior to an array measurement and by combining any number of register bits and producing a mask combination of X-Y-Z-axis readouts.

8. A method of selectively masking one-or-more rows from an array readout comprising the steps:

configuring a register with a one-or-more bit value (0 to N) prior to an array measurement and can be changed from measurement to measurement;

calculating a mask for a row by starting a readout at the row selected;

selecting the next row by adding the current value of the row and the value programmed into the register;

determine if the row should be skipped; and executing the calculations in a loop until all the row measurements are complete.

9. The method of claim 8 where multiple row mask register sets can be provided for array organizations where the rows are divided into sections such as an upper array row half and a lower array row half so that two row mask registers with independent calculations provide a unique row mask for the sections.

10. A method of selectively masking one-or-more columns from an array readout comprising the steps:

configuring a register with one-or-more variable length N-bit mask register codes and one-or-more variable length M-bit mask register bank codes that can be changed from measurement to measurement;

selecting a mask register within a selected bank using the N-bit mask register code;

calculating a mask for a column by starting a readout at the column selected;

selecting the next column using the current value of the column and the value programmed into the register;

determine if the column should be skipped; and executing the calculations in a loop until all the column measurements are complete.

11. The method of claim 10 where an M-bit mask code is used to select the mask register bank when the number of mask register banks equals the number of array banks.

12. The method of claim 10 where an M-bit mask code is used to select the mask register bank when the number of mask register banks is less than the number of array bank.

* * * * *